US008705392B2

(12) United States Patent
Prasad et al.

(10) Patent No.: US 8,705,392 B2
(45) Date of Patent: *Apr. 22, 2014

(54) MU-MIMO-OFDMA MULTI-RANK CQI AND PRECODER SIGNALING SCHEMES

(75) Inventors: Narayan Prasad, Wyncote, PA (US); Guosen Yue, Plainsboro, NJ (US); Mohammad A. Khojastepour, North Brunswick, NJ (US); Meilong Jiang, Plainsboro, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 247 days.

This patent is subject to a terminal disclaimer.

(21) Appl. No.: 13/080,416

(22) Filed: Apr. 5, 2011

(65) Prior Publication Data
US 2011/0243019 A1  Oct. 6, 2011

Related U.S. Application Data

(60) Provisional application No. 61/320,908, filed on Apr. 5, 2010, provisional application No. 61/389,492, filed on Oct. 4, 2010, provisional application No. 61/407,243, filed on Oct. 27, 2010.

(51) Int. Cl.
*H04L 12/26* (2006.01)
*H04W 4/00* (2009.01)
*H04B 7/02* (2006.01)

(52) U.S. Cl.
USPC ........... 370/252; 370/328; 370/329; 370/336; 375/260; 375/267

(58) Field of Classification Search
USPC ........................................ 700/53
See application file for complete search history.

(56) References Cited

U.S. PATENT DOCUMENTS

| 8,238,225 B2 * | 8/2012 | Wennstrom ................ 370/203 |
| 2008/0031191 A1 * | 2/2008 | Kashima et al. ............ 370/329 |

(Continued)

OTHER PUBLICATIONS

Jindal, N. "Antenna Combining for the MIMO Downlink Channel". IEEE Transactions on Wireless Communications. vol. 7, No. 10. Oct. 2008. pp. 3834-3844.

(Continued)

*Primary Examiner* — Hassan Kizou
*Assistant Examiner* — Amy Ling
(74) *Attorney, Agent, or Firm* — Joseph Kolodka

(57) ABSTRACT

Methods and systems for determining attributes of communication channels of MU-MIMO users in an (OFDMA) system are disclosed. One method includes receiving from a base station, for at least one sub-band of contiguous sub-carriers, an indication of an estimate of or an upper-bound on a total number of streams that are co-scheduled by the base station on the at least one sub-band. The method further includes determining one or more signal quality measures for the at least one sub-band based on the estimate of or the upper-bound on the total number of streams that are scheduled by the base station on the at least one sub-band in accordance with at least one of single-user scheduling rules or multi-user scheduling rules. In addition, the method includes transmitting to the base station an indication of the one or more signal quality measures and at least one tag identifying each signal quality measure as being determined in accordance with the single-user scheduling rules or the multi-user scheduling rules.

20 Claims, 3 Drawing Sheets

(56) References Cited

U.S. PATENT DOCUMENTS

| | | | | |
|---|---|---|---|---|
| 2010/0303034 A1* | 12/2010 | Chen et al. | ............. | 370/329 |
| 2010/0322176 A1* | 12/2010 | Chen et al. | ............. | 370/329 |
| 2011/0032839 A1* | 2/2011 | Chen et al. | ............. | 370/252 |
| 2012/0270535 A1* | 10/2012 | Chen et al. | ............. | 455/422.1 |
| 2013/0022021 A1* | 1/2013 | Wild et al. | ............. | 370/330 |

OTHER PUBLICATIONS

NTT Docomo, "Investigation on Enhanced DL MU-MIMO Processing Based on Channel Vector Quantization for LTE-Advanced" 3GPP TSG RAN W1 Meeting No. 58, R1-093511. Aug. 2009. pp. 1-8. Retrievable from: http://www.kusume.com/publication.

Ravindran, N., et al. "Limited Feedback-Based Block Diagonlization for the MIMO Broadcast Channel". IEEE Journal on Selected Areas in Communications. vol. 26, No. 8. Oct. 2008. pp. 1473-1482.

Trivellato, M., et al. "On Transceiver Design and Channel Quantization for Downlink Multiuser MIMO Systems With Limited Feedback". IEEE Journal on Selected Areas in Communications. vol. 26, No. 8. Oct. 2008. pp. 1494-1504.

Yoo, T., et al. "Multi-Antenna Downlink Channels With Limited Feedback and User Selection". IEEE Journal on Selected Areas in Communications. vol. 25, No. 7. Sep. 2007. pp. 1478-1491.

* cited by examiner

MU-MIMO-OFDMA MULTI-RANK CQI AND PRECODER SIGNALING SCHEMES

RELATED APPLICATION INFORMATION

This application claims priority to provisional application Ser. No. 61/320,908 filed on Apr. 5, 2010, provisional application Ser. No. 61/389,492 filed on Oct. 4, 2010 and provisional application Ser. No. 61/407,243 filed on Oct. 27, 2010, each of which is incorporated herein by reference.

This application is also related to commonly owned, co-pending utility application Ser. No. 12/642,126 filed on Dec. 18, 2009, which is incorporated herein by reference.

This application is also related to commonly owned, co-pending application Ser. No. 13/080,374, entitled 'MU-MIMO-OFDMA SYSTEMS AND METHODS FOR MULTI-RANK CQI COMPUTATION AND PRECODER SELECTION'), and commonly owned, co-pending application Ser. No. 13/080,403, entitled 'MU-MIMO-OFDMA METHODS AND SYSTEMS FOR SIGNALING MULTI-RANK CQIs AND PRECODERS'), each of which is filed concurrently herewith and is incorporated herein by reference.

BACKGROUND

1. Technical Field

The present invention relates to orthogonal frequency-division multiplexing based multiple access (OFDMA) multi-user (MU)-multiple input multiple output (MIMO) systems and, more particularly, to the determination and transmission of scheduling information and/or parameters related thereto for MU-MIMO users in such systems.

2. Description of the Related Art

In OFDMA MU (multi-user)-MIMO (multiple-input multiple-output) systems, each active user reports a preferred precoder matrix index (PMI), which identifies a specific vector (or matrix) in a code-book of unit norm vectors (or matrices) used to encode signals between the base station and users. Further, each user can report a channel quality index (CQI) to the base station, which, in turn, can use the PMI and CQI to determine an appropriate set of scheduled users and scheduling parameters for each user. The base station provides each scheduled user with its scheduling parameters indicating assigned resource blocks that comprise a set of subcarriers and OFDM symbols and that are used to transmit data to the respective scheduled user.

SUMMARY

One exemplary embodiment is directed to a method for determining attributes of communication channels of MU-MIMO users in an OFDMA system. The method includes receiving from a base station, for at least one sub-band of contiguous sub-carriers, an indication of an estimate of or an upper-bound on a total number of streams that are co-scheduled by the base station on the at least one sub-band. The method further includes determining one or more signal quality measures for the at least one sub-band based on the estimate of or the upper-bound on the total number of streams that are scheduled by the base station on the at least one sub-band in accordance with at least one of single-user scheduling rules or multi-user scheduling rules. In addition, the method includes transmitting to the base station an indication of the one or more signal quality measures and at least one tag identifying each signal quality measure as being determined in accordance with the single-user scheduling rules or the multi-user scheduling rules.

Another exemplary embodiment is directed to a method for determining attributes of communication channels of MU-MIMO users in an OFDMA system. The method includes receiving from a base station, for at least one sub-band of contiguous sub-carriers, an indication of a suggested or an upper-bound precoder rank, an indication of a total power applied to streams that are co-scheduled by the base station on the at least one sub-band and an indication of a fraction of the total power that is applied to streams that are scheduled for transmission to a particular user. The method further includes determining one or more signal quality measures for the at-least one sub-band based on at least one of the total power, the fraction or the suggested or upper-bound precoder rank in accordance with at least one of single-user scheduling rules or multi-user scheduling rules. In addition, the method includes transmitting to the base station an indication of the one or more signal quality measures and at least one tag identifying each signal quality measure as being determined in accordance with the single-user scheduling rules or the multi-user scheduling rules.

An alternative embodiment is directed to a receiver system for determining precoders for communication channels of MU-MIMO users in an OFDMA system. The receiver system includes a receiver that is configured to receive from a base station, for at least one sub-band of contiguous sub-carriers, an indication of a suggested or an upper-bound precoder rank, an indication of a total power applied to streams that are co-scheduled by the base station on the at least one sub-band and an indication of a fraction of the total power that is applied to streams that are scheduled for transmission to the receiver system. The system further includes a processor that is configured to determine a precoder matrix for the at least one sub-band based on at least one of the total power, the fraction or the suggested or upper-bound precoder rank in accordance with at least one of single-user scheduling rules or multi-user scheduling rules. In addition, the system includes a transmitter that is configured to transmit to the base station an indication of the precoder matrix and to transmit at least one tag identifying the precoder matrix as being determined in accordance with the single-user scheduling rules or the multi-user scheduling rules.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
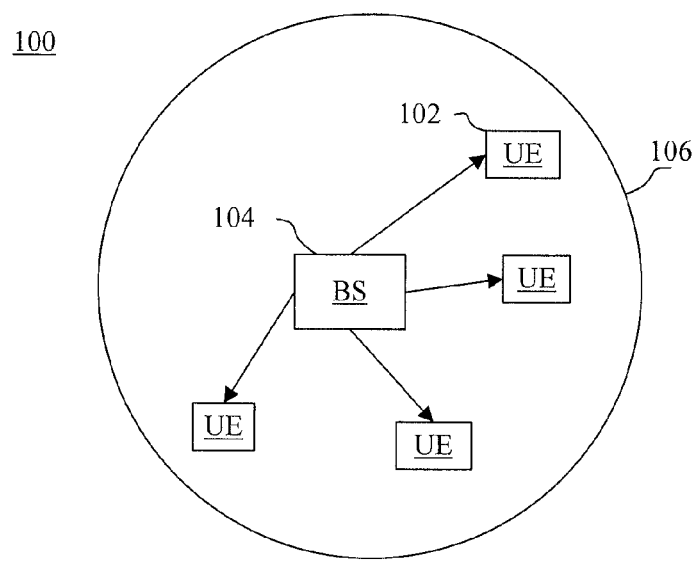
FIG. 1 is a high-level block diagram of an exemplary OFDMA-MU-MIMO system in accordance with an exemplary embodiment of the present invention.

Referring now in detail to the figures in which like numerals represent the same or similar elements and initially to FIG. 1, an OFDMA based multi-user (MU)-multiple input multiple output (MIMO) system 100 in which embodiments of the present invention may be implemented is illustrated. In the downlink of system 100, multiple scheduled users (UEs) 102 in a cell 106 are simultaneously served by a base station (BS) 104 on an available set of resource blocks (RBs), where each RB is a particular set of contiguous subcarriers and consecutive OFDM symbols.

In the MU-MIMO downlink from the BS, each scheduled user is served one or more data streams using precoding (or multi-rank beamforming). In accordance with one embodiment, each scheduled user is served a single data stream using beamforming or two data streams using rank-2 precoding. Each active user in the system reports a preferred matrix index (PMI) (per sub-band) to the BS, where a sub-band is a set of contiguous RBs. As indicated above, the reported PMI is an index that identifies a particular codebook of unit none vectors or a particular matrix in a codebook of semi-unitary matrices. For example, the codebook can be a codebook of semi-unitary rank-2 matrices. The codebooks are known in advance to the BS as well as all users. Each user also reports one or more channel quality indices (CQIs) (per sub-band), which are based on or are its estimates of the signal-to-interference-plus-noise ratios (SINRs) on that sub-band. In one embodiment, each user reports up to two channel CQIs (per sub-band). The BS collects the PMIs and CQIs reported by all active users and then determines a suitable set of users to schedule as well as their assigned rates. A key practical problem in the MU-MIMO downlink is that when computing its PMI and CQIs, a user does not have an accurate estimate of the interference it might experience (if scheduled) from the signals intended for the other co-scheduled users. Co-scheduled users comprise, for example, receivers that are assigned at least one resource block (RB) that overlaps with at least one RB assigned to one or more other users. In turn, co-scheduled streams comprise, for example, streams that are transmitted on at least one common resource block (RB). For example, co-scheduled streams can be streams that are transmitted on a common sub-band. If the user completely disregards the interference it might experience, it will then report optimistic CQIs and consequently be unable to support the rate assigned to it by the BS post-scheduling. Thus, obtaining more accurate reports from the users is important in improving the cell throughput offered by MU-MIMO.

To address the problem, aspects of the present principles inform user of an indication of an estimate of (or an upper bound on) the total number of streams (S) that the base station will schedule on a sub-band. Additionally or alternatively, to further aid in enabling users to determine accurate PMI and CQI estimates, embodiments can also inform a particular user of one or more of the following: a suggested precoding matrix rank (r), a maximum rank ($r_{max}$) for the particular user, an estimate of the per-RB total power ($\rho$) of signals transmitted to all users co-scheduled with the particular user, the fraction ($\alpha$) of the total power that will be employed for the data signals directed to the particular user, or any combination thereof. Further, embodiments can employ a variety of signaling schemes that convey such information to the user, as described in more detail herein below. Moreover, several methods of determining the PMI and CQI, based on the SINR, that use such conveyed parameters are also described. These methods significantly enhance the user's ability to reduce the mismatch between the SINR on which the user's report to the base station is based and the SINR the user actually observes after scheduling.

Figure 2:
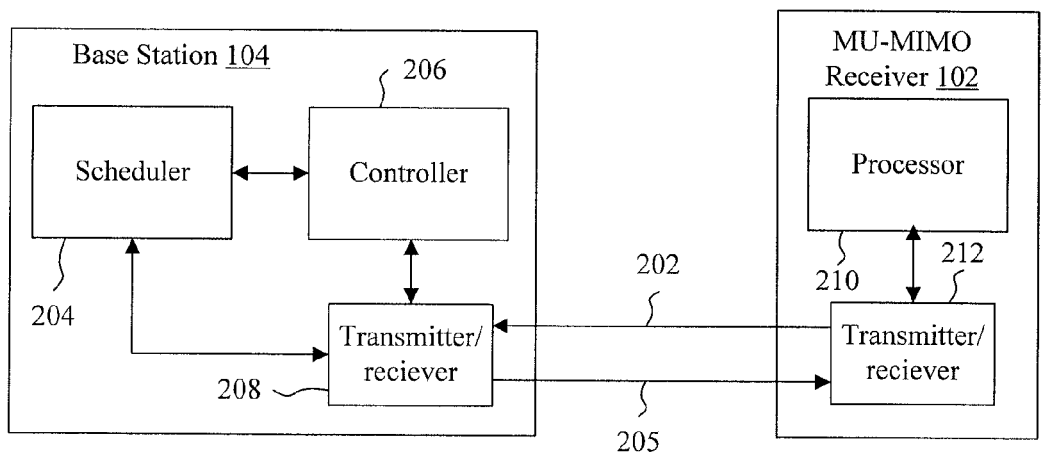
FIG. 2 is a high-level block/flow diagram of a base station and a MU-MIMO user in accordance with an exemplary embodiment of the present invention.

Referring to FIG. 2, with continuing reference to FIG. 1, exemplary implementations of a base station system 104 and a MU-MIMO receiver system 102 are illustrated. The base station 104 may include a scheduler 204 and a controller 206, while the user 102 can include processor 210. The controller 206 and processor 210 can use respective storage mediums provided in the base station 104 and receiver 102. In addition, the base station 104 and the receiver 102 can include transmitters/receivers 208 and 212, respectively, for the transmission and reception of control signals. The user 102 can transmit control signals to the base station 104 on one or more uplink control channels 202 and the base station 104 can transmit control signals to the user 102 on one or more downlink control channels 205. The elements of the base station 104 and the MU-MIMO receiver 102 are discussed in more detail below with respect to method embodiments.

It should be noted that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
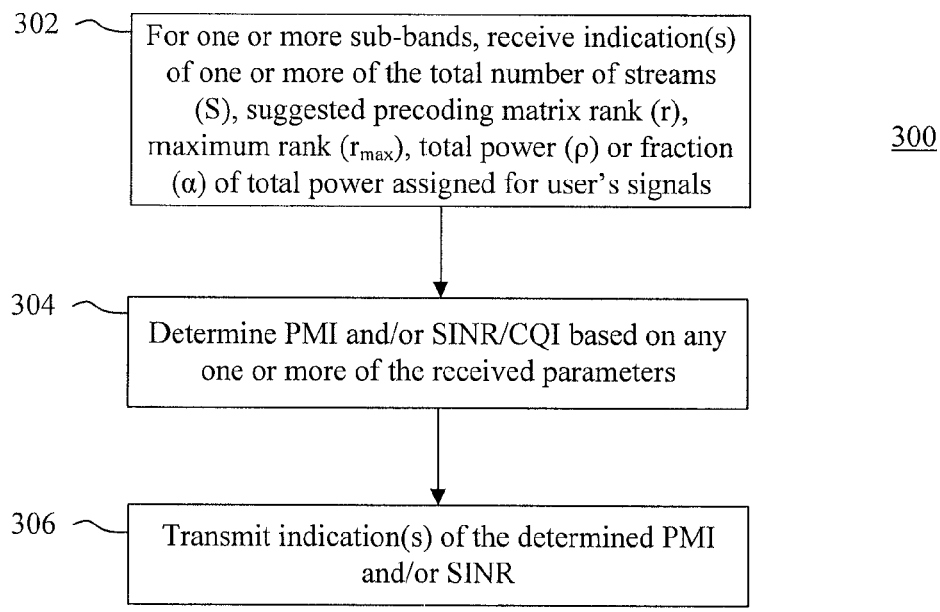
FIG. 3 is a flow diagram of an exemplary method for determining attributes of communication channels of MU-MIMO users in an OFDMA system.

Referring now to FIG. 3, with continuing reference to FIGS. 1 and 2, an exemplary method 300 for determining and conveying coding parameters and attributes of communication channels of multi-user (MU)-multiple input multiple output (MIMO) users in an orthogonal frequency division multiple access (OFDMA) system. Any of the users 102 can be configured to implement the method 300. In accordance with the method, the receiver 212, at step 302, can receive scheduling parameters for one or more sub-bands from, for example, the base station 104. For example, as stated above, the receiver 212 can receive an indication of any one or more of an estimate of (or an upper bound on) the total number of streams (S) that the base station will schedule on a sub-band, a suggested precoding matrix rank (r) for the particular user 102, a maximum rank ($r_{max}$) for the particular user 102, an estimate of the per-RB total power (ρ) of signals transmitted to all users co-scheduled with the particular user 102 and the fraction (α) of the total power that will be employed for the data signals directed to the particular user 102.

At step 304, the processor 210 can determine a PMI and/or SINR based on any one or more of the received parameters. Several different implementations of the determination step 304 are described in more detail herein below.

At step 306, the processor 210 can direct the transmitter 212 to transmit indication(s) of the determined PMI and/or SINR. For example, the receiver 102 can transmit the PMI and a CQI based on the SINR to the base station 104. Here, the processor 210 can determine the CQI by, for example, using a look up table correlating CQIs with SINRs stored in the storage medium at the receiver 102.

1. PMI Selection and CQI computation Rules

Prior to discussing detailed schemes for implementing the PMI/CQI determination step 304, an exemplary model of the signal received by the user 102 is described. Consider the narrowband received signal model at a user terminal of interest that is equipped with N receive antennas and where the base station 104 (e.g., eNodeB) has M transmit antennas, $$y = H^\dagger x + \eta, \quad (1)$$

where $H \in C^{M \times N}$ is the channel matrix and $\eta \sim C\mathcal{N}(0, I)$ is the additive noise. The signal vector x transmitted by the eNodeB can be expanded as $$x = \sum_{k \in \mathcal{U}} V_k s_k \quad (2)$$

where $\mathcal{U}$ is the set of users that are scheduled. $V_k$ is an M×$r_k$ semi-unitary matrix, referred to as a transmit precoder (or transmit precoding matrix), having M rows and $r_k$ columns, with $V_k^\dagger V_k = I_{r_k} \cdot s_k$ is the $r_k \times 1$ symbol vector corresponding to user k∈υ. Further, let $S = \sum_{k \in \mathcal{U}} r_k$ be the total number of streams that are co-scheduled. Here, each scheduled stream is assigned an identical power ρ'. The controller 206 of the base station selects the set of scheduled users, $\mathcal{U}$, along with their transmit precoding matrices and assigned rates, based on the reports received from the active users. In particular, the $k^{th}$ user reports a PMI that identifies a quantization matrix which is a semi-unitary matrix $G_k$ (having M rows and $R_k$ columns) from a codebook of such matrices. In addition, the user also reports up-to $R_k$ CQIs. Based on these reports, the controller 206 of the base station 104 selects a set $\mathcal{U}$ of users that have reported mutually (near-)orthogonal matrices or vectors $\{G_k\}_{k \in \mathcal{U}}$ and which, optionally, also yield a high weighted sum rate. The controller 206 can then determine the transmit precoding matrices and rates for the selected users. For example, controller 206 can either set $V_k = G_k \forall k \in \mathcal{U}$ or it canperform a block diagonalization technique on $\{G_k\}_{k \in \mathcal{U}}$ to determine $\{V_k\}_{k \in \mathcal{U}}$. Note that $r_k$ is the number of streams that are used to serve user k and it is less than or equal to $R_k$.

The processor 210 of the user of interest 102 can estimate ρ'H. It can be assumed that the user of interest also has an estimate of S available. In practice, the base station 104 can convey an estimate of S (or an upper bound on S) to a user in a semi-static manner and such an estimate can be user-specific. The user can then use its estimates of ρ'H and S as described further herein below to select PMIs and to compute SINRs.

It should be noted that the only information the BS 104 has about the channel seen by a particular user k in this example is through $G_k$ and the (up-to) $R_k$ CQIs. Thus, the transmit precoding matrices that are constructed by the BS 104 may result in interference at the user end and the rate assigned by it may also not be supportable by the user. The rate supportable by a scheduled user in the aftermath of scheduling depends on the set of all assigned transmit precoding matrices. This supportable rate can thus not be exactly conveyed by the user in its CQI reports, as, at that instance, the user is unaware of the set of all assigned transmit precoding matrices. As stated above, to address the problem, the BS 104 can convey to each active user, an estimate of (or an upper bound on) the total number of streams that it expects to schedule on a sub-band. This number can be user-specific. In addition, the BS can also convey a suggested rank value to each active user. In accordance with one aspect, a user that does not receive a suggested rank value (or equivalently receives a rank value implying 'no-restriction') is free to select a quantization precoder of any rank, whereas the one that receives a suggested rank, selects a quantization precoder having the suggested rank. Together, these parameters permit the user to better account for the interference it might observe post-scheduling and hence report more accurate CQIs.

2. PMI Selection and SINR Computation Schemes and Rules

Preliminarily, the case in which the user reports one PMI along with one or more CQIs (each based on a computed SINR) is considered. In general the PMI can correspond to a precoder of rank r, where 1≤r≤min{M,N}. In the scenario where fast-rank adaptation is permitted in MU-MIMO, to determine the PMI at step 304, the processor 210 of the user 102 can determine the best precoder for each value of r and can then select the precoder which yields the overall highest rate. In the case where only slow rank adaptation is permitted, the base station 104 can inform the user about a suitable r in a semi-static manner and the processor 210 of the user 102 then selects a precoder matrix of that rank.

Next, in order to determine a suitable semi-unitary matrix $\hat{G}_r$ from a set or codebook of rank-r semi-unitary matrices, $C_r$, and/or up-to r SINRs, the processor 210 of the user of interest can use any one or more of the following schemes. In particular, the following schemes and computations can be performed by the processor 210 to implement the determination step 304 of the method 300 described above. One feature of the schemes and rules derived below is that they attempt to account for the interference due to signals intended for the co-scheduled users and maximize a bound on the expected SINR or the expected capacity.

For example, in one implementation, the user 102 can select the PMI based on a capacity metric. Here, the user 102 can select the PMI as follows:

$$\hat{G}_r = \arg\max_{G \in C_r}\{\ln|I + \rho' G^\dagger H(I + \tilde{\rho} H^\dagger(I - GG^\dagger)H)^{-1} H^\dagger G|\} \quad (3)$$

$$= \arg\max_{G \in C_r}\{\ln|I + \tilde{\rho}H^\dagger(I + GG^\dagger)H + \rho' H^\dagger GG^\dagger H| - \ln|I + \tilde{\rho}H^\dagger(I - GG^\dagger)H|\}$$

where $$\tilde{\rho} = \frac{\rho'(S-r)}{M-r}$$

and $\rho'$ is the power-per-stream and can be assumed to be $\rho/S$ with $\rho$ being the total power. The descriptions of $\tilde{\rho}$ and $\rho'$ also apply to the implementations of PMI selection and CQI computation schemes and rules described herein below, unless noted otherwise.

In an alternative implementation, which can be employed in MMSE (minimum mean square error) based receivers, the user 102 can select the PMI after determining r SINRs for each matrix in $C_r$. Let $G=[g_1, \ldots, g_r]$. To select the PMI, the user 102 can compute the following, $G=[g_1, \ldots, g_r]$.

$$\hat{G}_r = \arg\max_{G \in C_r}\left\{\sum_{j=1}^r \ln(1 + SINR_{j,r}^{MMSE}(G))\right\} \quad (4)$$

where $$SINR_{j,r}^{MMSE}(G) = \frac{\rho' g_j^\dagger H(I + \tilde{\rho}H^\dagger H + (\rho' - \tilde{\rho})H^\dagger GG^\dagger H)^{-1} H^\dagger g_j}{1 - \rho' g_j^\dagger H(I + \tilde{\rho}H^\dagger H + (\rho' - \tilde{\rho})H^\dagger GG^\dagger H)^{-1} H^\dagger g_j} \quad (5)$$

In another implementation, which can be employed in an SIC (successive interference cancellation), the user 102 can also select a PMI after determining r SINRs for each matrix in $C_r$. Here, we let $G=[g_1, \ldots, g_r]$ and suppose the order of decoding to be $\{1, \ldots, r\}$. To select the PMI, the user 102 can compute the following:

$$\hat{G}_r = \arg\max_{G \in C_r}\left\{\sum_{j=1}^r \ln(1 + SINR_{j,r}^{SIC}(G))\right\} \quad (6)$$

where $$SINR_{j,r}^{SIC}(G) = \quad (7)$$

$$\frac{\rho' g_j^\dagger H\left(I + \tilde{\rho}H^\dagger(I - GG^\dagger)H + \rho' H^\dagger \sum_{q=j}^r g_q g_q^\dagger H\right)^{-1} H^\dagger g_j}{1 - \rho' g_j^\dagger H\left(I + \tilde{\rho}H^\dagger(I - GG^\dagger)H + \rho' H^\dagger \sum_{q=j}^r g_q g_q^\dagger H\right)^{-1} H^\dagger g_j}$$

It should be noted that, using the chain rule, $$\sum_{j=1}^r \ln(1 + SINR_{j,r}^{SIC}(G)) =$$

$$\ln|I + \tilde{\rho}H^\dagger(I - GG^\dagger)H + \rho' H^\dagger GG^\dagger H| - \ln|I + \tilde{\rho}H^\dagger(I - GG^\dagger)H|$$

so that the user 102 can compute an optimal PMI use using (3) and can then compute r SINRs for the $\hat{G}_r$ so determined.

In accordance with another implementation, which can employ a single unified SINR for an MMSE receiver when r>1, the user 102 can select a PMI after determining one SINR for each matrix in $C_r$. We let $G=[g_1, \ldots, g_r]$. Accordingly, the user 102 can compute the precoder and the SINR as follows $$\hat{G}_r = \arg\max_{G \in C_r}\{\ln(1 + SINR_{j,r}^{MMSE}(G))\} \quad (8)$$

where $$\ln(1 + SINR_{j,r}^{MMSE}(G)) = \ln|I + \tilde{\rho}H^\dagger H + (\rho' - \tilde{\rho})H^\dagger GG^\dagger H| -$$

$$\ln\left|I + \tilde{\rho}H^\dagger H + \left(\frac{\rho'(r-1)}{r} - \tilde{\rho}\right)H^\dagger GG^\dagger H\right|$$

In an alternate scheme for MMSE based receivers, the user 102 can select a PMI after determining r SINRs for each matrix in $C_r$. We let $G=[g_1, \ldots, g_r]$. Here, for each choice of precoder G we consider the worst possible interferers scheduled along S−r vectors in the M−r dimensional null-space of $G^\dagger$ subject to some constraints. In particular, $$\hat{G}_r = \arg\max_{G \in C_r} \min_{U \in C^{(M-r)\times(S-r)}; UU^\dagger \leq I}\left\{\sum_{j=1}^r \ln(1 + SINR_{j,r}^{MMSE}(G, U))\right\}$$

where $$SINR_{j,r}^{MMSE}(G, U) =$$

$$\rho' g_j^\dagger H\left(I + \rho' \sum_{m \neq j} H^\dagger g_m g_m^\dagger H + \rho' H^\dagger QUU^\dagger Q^\dagger H\right)^{-1} H^\dagger g_j,$$

$$QQ^\dagger = I - GG^\dagger, Q^\dagger Q = I.$$

The following two special cases are particularly important.

For Rank-1 or beamforming with r=1, the user 102 can select optimal vector $\hat{g}_1 \in C_1$ and can compute only one SINR (per vector) in accordance with the following. Specializing either (4) or (6) to this case, we have $$\hat{g}_1 = \arg\max_{g \in C_1}\{SINR_{1,1}^{MMSE}(g)\} \quad (9)$$

where $$SINR_{1,1}^{MMSE}(g) = \rho' g^\dagger H(I + \tilde{\rho}H^\dagger(I - gg^\dagger)H)^{-1} H^\dagger g$$

with $$\tilde{\rho} = \frac{\rho'(S-1)}{M-1}.$$

It can be shown that the rule in (9) is equivalent to the following rule that is much simpler to compute.

$$\hat{g}_1 = \underset{g \in C_1}{\arg\max} \{g^\dagger H(I + \tilde{\rho}H^\dagger H)^{-1} H^\dagger g\} \quad (10)$$

For Rank-2 or precoding with r=2, the user 102 can select an optimal matrix $\hat{G}_2 \in C_2$ using the SIC formula in (6) with r=2 and can direct the feed back of 2 CQIs based on the computed SINRs in the form of a base-CQI and a delta-CQI. Expanding $\hat{G}_2 = [\hat{g}_{1,2}, \hat{g}_{2,2}]$, we note that in this case the CQI computed using first SINR, $SINR_{1,2}^{SIC}(\hat{G}_2)$, is the base CQI. The second CQI is equal to the base-CQI plus delta-CQI and corresponds to the second SINR, $SINR_{2,2}^{SIC}(\hat{G}_2)$. This permits the controller 206 of the base station 104 to perform a rank-override in which the user is scheduled as a rank-1 MU-MIMO user based on the pair $(SINR_{2,2}^{SIC}, \hat{g}_{2,2})$. Alternatively, the user 102 can select an optimal matrix $\hat{G}_2 \in C_2$ using the unified formula in (8) with r=2. The base CQI can correspond to $SINR_2^{MMSE}(\hat{G}_2)$. The second CQI is equal to the base-CQI plus delta-CQI and corresponds to the following SINR $$\frac{\rho' \hat{g}_{2,2}^\dagger H(I + \tilde{\rho}H^\dagger H)^{-1} H^\dagger \hat{g}_{2,2}}{1 - \tilde{\rho}\hat{g}_{2,2}^\dagger H(I + \tilde{\rho}H^\dagger H)^{-1} H^\dagger \hat{g}_{2,2}} \quad (11)$$

with $$\tilde{\rho} = \frac{\rho'(S-1)}{M-1}.$$

This permits the base station 104 to perform a rank-override in which the user is scheduled as a rank-1 MU-MIMO user based on $\hat{g}_{2,2}$ and the SINR given in (11).

2.1 Alternate PMI Selection and CQI Computation Schemes

In accordance with an alternate PMI selection and CQI computation scheme, the user 102 can first select a matrix from $C_r$ by quantizing the r dominant right singular vectors of $H^\dagger$. In particular, let $H^\dagger = U\Lambda \tilde{V}^\dagger$ be the SVD (single value decomposition) of $H^\dagger$ where $\tilde{V}$ is a M×N semi-unitary matrix. Let $\hat{V}_{(r)}$ denote the matrix formed by the first r columns of $\hat{V}$ which are the r dominant right singular vectors of $H^\dagger$. Then, the user 102 can select a matrix from $C_r$ by using $$\hat{G}_r = \underset{G \in C_r}{\arg\max} \{tr(\tilde{V}_{(r)}^\dagger G_r G_r^\dagger \tilde{V}_{(r)})\} \quad (12)$$

After such a $\hat{G}_r$ is determined, the user 102 can compute the r SINRs corresponding to $\hat{G}_r$ using either (5) or (7).

In accordance with another alternate PMI selection and CQI computation scheme, which can be employed for SU (single-user)-MIMO receivers, to determine a suitable precoding matrix from $C_r$ along with corresponding SINRs, the user 102 of interest can use the following SU-MIMO rules, which completely neglect the interference that will be caused due to other co-scheduled streams. For convenience, only the MMSE based receiver is considered here. Then, the user 102 can select the PMI after determining r SINRs for each matrix in $C_r$, as provided below. We let $G = [g_1, \ldots, g_r]$.

$$\hat{G}_r = \underset{G \in C_r}{\arg\max} \left\{ \sum_{j=1}^{r} \ln(1 + SINR_{j,r}^{MMSE}(G)) \right\} \quad (13)$$

where $$SINR_{j,r}^{MMSE}(G) = \frac{\rho}{r} g_j^\dagger H\left(I + \frac{\rho}{r} H^\dagger GG^\dagger H - \frac{\rho}{r} H^\dagger g_j g_j^\dagger H\right)^{-1} H^\dagger g_j$$

with ρ denoting the total power that is equally divided among all streams.

2.2 Derivations of PMI Selections

The capacity metric in (3) for selecting a PMI of rank r, where 1≤r≤N, will now be derived for completeness purposes. Suppose that the user 102 of interest considers reporting any PMI $G_r \in C^{M \times r}$ to the base station. The user 102 assumes that upon doing so, the transmit precoder employed by the base station 104 to serve the user 102 will be $V_1 = G_r$ and that the user 102 will be co-scheduled with other users who in turn are served using transmit precoders that lie in the null-space of $V_1^\dagger$, i.e., $V_1^\dagger V_k = 0$, $\forall k \neq 1$. In addition, the user 102 assumes that there will be S−r such co-scheduled streams (intended for the other users) in total. Thus, the model that the user deems will be seen by it post-scheduling is $$y = H^\dagger G_r s_1 + \sum_{k \neq 1} H^\dagger V_k s_k + \eta, \quad (14)$$

where $H \in \mathbb{C}^{M \times N}$ is the channel matrix and $\eta \sim \mathcal{CN}(0, I)$ is the additive noise. In order to determine a rate that can be obtained over this model, the user 102 proceeds as follows. To determine the rate, the user 102 should obtain the covariance matrix of the interference. However, because the transmit precoders employed for the co-scheduled users are not known, the user employs an expected covariance matrix of the interference. This expected covariance matrix is computed after assuming that the co-scheduled streams are transmitted along vectors that are isotropically distributed in the null space of $V_1^\dagger$. In particular, let $P = G_r G_r^\dagger$ be an orthogonal projection and let $P_\perp = I - P$ denote its orthogonal complement. Because the rank of $G_r$ is r, we have that the rank of $P_\perp$ is M−r so that it can be decomposed as $P_\perp = SS^\dagger$, where $S \in \mathbb{C}^{M \times M-r}$ is a semi-unitary matrix of rank M−r. Note that one choice of S can be obtained from a deterministic function of $G_r$. Then, the assumption made by the user 102 is that each co-scheduled stream is transmitted along a vector of the form Su, where u is isotropically distributed in $\mathbb{C}^{M-r}$. Based on this assumption, the following lemma is offered:

Lemma 1

For a given H, $G_r$, the expected covariance matrix of the interference can be computed as $$E\left[H^\dagger \sum_{k \neq 1} V_k V_k^\dagger H\right] = \frac{S-r}{M-r} H^\dagger P_\perp H \quad (15)$$

Using lemma 1, the rate computed by the user for the choice of $G_r$ is given by $$\ln\left|I + \rho' H^\dagger PH^\dagger + \rho' E\left[H^\dagger \sum_{k \neq 1} V_k V_k^\dagger H\right]\right| - \ln\left|I + \rho' E\left[H^\dagger \sum_{k \neq 1} V_k V_k^\dagger H\right]\right|. \quad (16)$$

Using (15) in (16) yields $$\ln\left|I + \rho' H^\dagger P H + \rho' \frac{S-r}{M-r} H^\dagger P_\perp H\right| - \ln\left|I + \rho' \frac{S-r}{M-r} H^\dagger P_\perp H\right| \quad (17)$$

The user thus employs the rule in (3) which optimizes (17) over all $G_r$ in the codebook of rank-r semi-unitary matrices.

3. PMI, Best-Companion-PMI Selection and CQI Computation Schemes and Rules

In accordance with exemplary aspects of the present principles, the processor 210 of the receiver 102 can determine, at step 304 of the method 300, a best companion PMI in addition to a selected PMI by employing the following schemes. Here, processor 210 can feed back the PMI and the best companion PMI to the base station 104 with the understanding that the codeword corresponding to such a companion PMI generates the least amount of interference for the user. In addition to S (and possibly r), we assume that the user of interest knows (or has been informed about) $r^c$, the rank of the codeword to be selected as the companion. Here, the user 102 can receive $r^c$ at step 302 of the method 300.

In accordance with one implementation, the user 102 can utilize a capacity metric to determine the PMI and the best companion PMI. For example, the user 102 can select a matrix $\hat{G}_r$ along with the best-companion matrix, $\hat{G}_{r^c}$ as follows:

$$\{\hat{G}_r, \hat{G}_{r^c}\} = \arg\max_{G \in C_r, G_{r^c} \in C_{r^c}} \left\{\ln\left|I + \bar{\rho} H^\dagger P^\perp_{G,G_{r^c}} H + \rho' H^\dagger G G^\dagger H + \rho' H^\dagger G_{r^c} G^\dagger_{r^c} H\right| - \ln\left|I + \bar{\rho} H^\dagger P^\perp_{G,G_{r^c}} H + \rho' H^\dagger G_{r^c} G^\dagger_{r^c} H\right|\right\}$$

where $\bar{\rho} = \frac{\rho'(S - r - r^c)}{r'}$, $P^\perp_{G,G_{r^c}} = I - [G, G_{r^c}][G, G_{r^c}]^+$ is a projection matrix and $$r' = \text{Rank}(P^\perp_{G,G_{r^c}}).$$

Note that since both $G, G_{r^c}$ are semi-unitary matrices, when $G_{r^c}^\dagger G = 0$, we can also write $$P^\perp_{G,G_{r^c}} = I - GG^\dagger - G_{r^c} G^\dagger_{r^c}$$

and in this case $r' = M - r - r^c$.

In accordance with another implementation, which can be employed in an MMSE base receiver, the user 102 can select a matrix $\hat{G}_r$ after determining r SINRs for each matrix in $C_r$. The user 102 can select the best-companion matrix, $\hat{G}_{r^c}$ as follows. We let $G = [g_1, \ldots, g_r]$.

$$\{\hat{G}_r, \hat{G}_{r^c}\} = \arg\max_{G \in C_r, G_{r^c} \in C_{r^c}} \left\{\sum_{j=1}^{r} \ln(1 + SINR^{MMSE}_{j,r}(G, G_{r^c}))\right\} \quad (18)$$

where $$SINR^{MMSE}_{j,r}(G, G_{r^c}) = \rho' g_j^\dagger H \left(I + \bar{\rho} H^\dagger P^\perp_{G,G_{r^c}} H - \rho' H^\dagger G_{r^c} G^\dagger_{r^c} H + \rho' H^\dagger \sum_{k \neq j} g_k g_k^\dagger H\right)^{-1} H^\dagger g_j, \quad (19)$$

Note that the alternate rule derived in Section 2.1 above can be readily extended to this scenario. In particular, the user 102 first uses (12) to determine the matrix $\hat{G}_r$. Next, it again uses (12) to determine the matrix $\hat{G}_{r^c}$, except the search is over $C_{r^c}$ and $\tilde{V}_{(r)}$ is replaced by $\hat{V}_{(r^c)}$, with $\hat{V}_{(r^c)}$ denoting the M×$r^c$ matrix formed by the $r^c$ right singular vectors of $H^\dagger$ that correspond to the $r^c$ smallest singular values. Once $\hat{G}_r$, $\hat{G}_{r^c}$ are determined, the user 102 can compute the r SINRs corresponding to $\hat{G}_r$, $\hat{G}_{r^c}$ using (19). Alternatively, the user 102 can compute the best companion PMI using the aforementioned rules. The user 102 can then report to the base station 104 the CQI(s) that are based on SINR(s) without the best companion (for example using (5) with $\hat{G}_r$) along with a delta CQI that corresponds to the average difference between the SINRs without the best companion and those with the best companion ((19) with $\hat{G}_r$, $\hat{G}_{r^c}$).

4. PMI, Inter-Cell Companion-PMI Selection and CQI Computation Schemes and Rules In accordance with embodiments of the present principles, an exemplary narrowband received signal model at a user terminal 102 that is also interfered with by other base stations that do not serve the user 102 can be considered. Here, in this particular example, let I denote the set of interferers.

$$y = H^\dagger x + \sum_{q \in I} H_{(q)}^\dagger x_{(q)} + \eta \quad (20)$$

where now $H_{(q)} \in \mathbb{C}^{M_q \times N}$ is the channel matrix seen from the $q^{th}$ interfering base station, with $M_q$ being the number of transmit antennas at the $q^{th}$ base station. Note that the signal vector $x_{(q)}$ transmitted by the $q^{th}$ base station can be expanded as $$x_{(q)} = \sum_{m \in \mathcal{V}_{(q)}} V_{(q),m} s_{(q),m} \quad (21)$$

where $\upsilon_{(q)}$ is the set of users that are scheduled by the $q^{th}$ interfering base station.

Thus, at step 306 of the method 300, the user 102 of interest can feed back to its serving base station, a PMI for the direct channel it sees from its serving base station 104 and a worst-companion PMI for each one of the dominant interfering base stations. In addition to S and possibly r, the user of interest 102 knows, for each base station q, an estimate, $S_q$, of the number of streams the $q^{th}$ interfering base station expects to simultaneously schedule. Further, it can be assumed that the user of interest 102 also knows, for each base station q, $r_q$, which is the number of dimensions the $q^{th}$ interfering base station is prepared to surrender. For example, the processor 210 of the receiver 102 can, at step 302 of the method 300, receive from the serving base station 104 $S_q$ and $r_q$ for each interfering base station q. In particular, given $r_q$, at step 304 of the method 300, the user 102 can quantize $H_{(q)}$ using an $M_q \times r_q$ semi-unitary matrix $\hat{G}_{(q)}$ (which can be thought of as the worst-companion to $\hat{G}_r$ which quantizes the direct channel). The interfering base station q, will then schedule up-to $S_q$ streams using precoding matrices that lie in a subspace orthogonal to the span of $\hat{G}_{(q)}$. The processor 210 of the user 102 can perform the following schemes to determine the PMI and the companion PMI and thereby implement step 304 of the method 300.

In accordance with one implementation, the user 102 can determine the PMIs by employing a capacity metric. For example, the user 102 can select a matrix $\hat{G}_r$ for the direct channel along with the worst-companion matrices, $\{\hat{G}_{(q)}\}_{q \in I}$.

$$\{\hat{G}_r, \{\hat{G}_{(q)}\}\} = \arg\max_{G \in C_r, \{G_q \in C_{r_q}\}_{q \in I}} \left\{ \begin{array}{l} \ln\left|I + \tilde{\rho}H^\dagger(I - GG^\dagger)H + \rho' H^\dagger GG^\dagger H + \sum_{q \in I} \hat{\rho}_q H_{(q)}^\dagger(I - G_{(q)}G_{(q)}^\dagger)H_{(q)}\right| \\ -\ln\left|I + \tilde{\rho}H^\dagger(I - GG^\dagger)H + \sum_{q \in I} \hat{\rho}_q H_{(q)}^\dagger(I - G_{(q)}G_{(q)}^\dagger)H_{(q)}\right| \end{array} \right\}$$

where $$\tilde{\rho} = \frac{\rho'(S-r)}{M-r}, \hat{\rho}_q = \frac{\rho'_q S_q}{M_q - r_q}$$

with $\rho_q'$ being the power per stream used by the $q^{th}$ interfering base station.

In accordance with another implementation, which can be employed in an MMSE based receiver, the processor 210 of the receiver 102 can select a PMI $\hat{G}_r$ for the direct channel after determining r SINRs for each matrix in $C_r$ at step 304. Also at step 304, the receiver 102 can select the worst-companion PMIs, $\{\hat{G}_{(q)}\}_{q \in I}$. We let $G = [g_1, \ldots, g_r]$.

$$\{\hat{G}_r, \{\hat{G}_{(q)}\}\} = \arg\max_{G \in C_r, \{G_q \in C_{r_q}\}_{q \in I}} \left\{ \sum_{j=1}^r \ln\left(1 + SINR_{j,r}^{MMSE}\left(G, \{G_q \in C_{r_q}\}_{q \in I}\right)\right) \right\} \quad (22)$$

where

-continued $$SINR_{j,r}^{MMSE}\left(G, \{G_q \in C_{r_q}\}_{q \in I}\right) = \quad (23)$$

$$\rho' g_j^\dagger H \left( I + \tilde{\rho} H^\dagger (I - GG^\dagger) H + \rho' H^\dagger \sum_{k \neq j} g_k g_k^\dagger H + \sum_{q \in I} \hat{\rho}_q H_{(q)}^\dagger (I - G_{(q)} G_{(q)}^\dagger) H_{(q)} \right)^{-1} H^\dagger g_j$$

It should be noted that the alternate rule derived in section 2.1 above can be extended to this scenario. Here, the user 102 first uses (12) to determine the matrix $\hat{G}_r$. Next, for each $q \in I$, the user 102 uses (12) to determine the matrix $\hat{G}_{(q)}$, except the search is over $C_{r_q}$ and $\hat{V}_{(r)}$ is replaced by $\hat{V}_{(r_q)}$, with $\hat{V}_{(r_q)}$ denoting the $M \times r_q$ matrix formed by the $r_q$ right singular vectors of $H_{(q)}^\dagger$ that correspond to its $r_q$ largest singular values. Once $\{\hat{G}_r, \{\hat{G}_{(q)}\}\}$ are determined, the user 102 can compute the r SINRs corresponding to $\{\hat{G}_r, \{\hat{G}_{(q)}\}\}$ using (23). Alternatively, the user 102 can compute the worst-companion PMIs using the aforementioned rules. The user 102 can, at step 306, then report the CQI(s) that are based on SINR(s) without the worst companions (for example using (5) with $\hat{G}_r$) along with a delta CQI that corresponds to the average difference between the SINRs without the worst companions and those with the worst companions ((23) with $\hat{G}_r, \{\hat{G}_{(q)}\}$).

5. Signaling Schemes

As noted above, embodiments of the present principles can employ a variety of signaling schemes that convey parameter information to the user 102. Specific examples of such signaling schemes are described in detail herein below. In particular, one or more of schemes and rules concerning the determination of PMIs and SINRs/CQIs described above can be employed to implement each of the signaling schemes described herein below. The operations performed in the schemes are enabled by signaling from the base station 104 certain parameters on a downlink (feed-forward) control channel that are then received as inputs by the user 102. The feed back is sent by the user 102 on an uplink (feedback) control channel and is received by the base station 104. The parameters signaled by the base-station to a user 102 are interpreted by that user 102 in particular ways that are described in detail herein below. Similarly, some assumptions made by the user 102 in computing its feed back report (such as the assumed power-per-data-stream) should be known to the base-station 104. Moreover, as described below, the feed back sent by the user 102 should permit the base station 104 to unambiguously determine the portion of the feed back determined by the user via SU-MIMO rules (in which the user assumes no other user will be co-scheduled with it) and the portion determined via MU-MIMO rules (in which the user accounts for the post-scheduling intra-cell interference, as discussed above).

5.1

In accordance with one implementation, the base station 104 can employ semi-static signaling to inform a user of an estimate of (or an upper bound on) the total number of streams, S, that the base station expects to co-schedule on a sub-band. The signaling also includes a suggested per-user MU-MIMO rank r for that user. The parameter S is cell specific (i.e., is identical for all users in a cell) whereas r is user-specific (i.e., can be different for different users in a cell).

5.1a

After receiving the signal including S and r, the user 102 can compute PMIs/CQIs under MU-MIMO rules. In particular, the user 102 can determine a precoder of rank r from a codebook of rank r matrices (the precoder being uniquely identified by the rank r and a PMI) along with corresponding SINRs (which are combined into one or more CQI(s)) and can report the PMI and the CQI (s) to the base station 104. While the exact rule is an implementation-dependent, the aim of such a rule is to account for the post-scheduling interference using the knowledge that (up-to) S-r interfering streams may be co-scheduled. A simple rule is employed here. In particular, suppose that the estimated channel matrix at the user terminal 102 of interest is given by $H^\dagger \in C^{N \times M}$ where N, M are the number of receive and transmit antennas at the user 102 and the base station 104, respectively. Then, in order to compute SINR(s) for each choice of a semi-unitary $M \times r$ precoder G, the user 102 assumes that the interference covariance matrix is equal to $$\frac{\rho(S-r)}{S(M-r)} H^\dagger (I - GG^\dagger) H$$

(up-to a scaling factor), where ρ is an estimate of the total energy transmitted per resource element. Specific rules under this assumption were described in detail herein above. It should be noted that this interference covariance matrix is derived after assuming that the interfering streams will be scheduled along vectors that are isotropically distributed in the null space of $G^\dagger$ and then taking an expectation over all such vectors. The assumption about the base station 104 co-scheduling streams along vectors in the null space of $G^\dagger$ (if the user reports G as the PMI) will be closely satisfied in practice. Moreover, the isotropic assumption puts no further constraints and simplifies computation at the user 102 by enabling the utilization of simple formulas. A more conservative choice is for the user to assume the interference covariance matrix to be equal to $$\frac{\rho}{S} H^\dagger (I - GG^\dagger) H$$

while computing its SINRs.

Accordingly, in one particular embodiment of method 300, the receiver 212 of the user 102 can receive S and r from the base station 104 at step 302. At step 304, the processor 210 can determine a precoder of rank r and can compute (up-to) r SINRs assuming that there can be S-r co-scheduled interfering streams and that equal power is assigned to all S streams. Also at step 304, the processor 210 can combine the computed SINRs into one or more CQIs. Further, at step 304, the processor can denote the index identifying the precoder as an "MU-PMI" and the computed CQIs as "MU-CQI(s)," using, for example, corresponding tags for "MU-PMI" and "MU-CQI(s)." At step 306, the processor 210 can direct the transmitter 212 to feedback the denoted MU-PMI and MU-CQIs to the base station 104.

Optionally, the user 102 may also use SU-MIMO rules (i.e., rules that do not account for post-scheduling intra-cell interference) to determine another set of CQI(s), a PMI and a rank index (RI) denoting the rank of the precoder indexed by this PMI. In particular, the user assumes that no other stream intended for another user will be co-scheduled and then determines a precoder (which is uniquely identified by a RI and a PMI) along with the corresponding SINRs. It may then combine these SINRs into one or more CQI(s) and report these CQI(s) and PMI,RI along with the CQI(s) and PMI determined using the MU-MIMO rules. The feed back is done in a manner that permits the base station to unambiguously determine the portion of the feed back determined via SU-MIMO rules and the portion of the feed back determined via MU-MIMO rules.

Optionally, the user 102 may use the precoder determined via MU-MIMO rules and may then compute additional SINRs and CQI(s) for that precoder using SU-MIMO rules. These additional CQI(s) can then be reported along with the CQI(s) and PMI determined using the MU-MIMO rules.

Accordingly, in another embodiment of method 300, the receiver 212 of the user 102 can receive S and r from the base station 104 at step 302. At a first sub-step of step 304, the processor 210 can determine a precoder of rank r and can compute (up-to) r SINRs assuming that there can be S–r co-scheduled interfering streams and that equal power is assigned to all S streams. Also at the first sub-step, the processor 210 can combine the computed SINRs into one or more CQIs. Further, at the first sub-step of step 304, the processor 210 can denote the index identifying the precoder as an "MU-PMI" and the computed CQIs as "MU-CQI(s)," by employing, for example, corresponding tags for "MU-PMI" and "MU-CQI(s)." At a second sub-step of step 304, using the precoder identified by MU-PMI, the processor 210 can determine additional up-to r SINRs assuming that only r streams with equal power will be scheduled and that no interfering stream will be co-scheduled. At the second sub-step, the processor 210 can combine the computed SINRs into one or more CQIs and can denote these additional CQIs as "SU-CQIs" using, for example, a corresponding tag. At step 306, the processor 210 can direct the transmitter 212 to feed-back the denoted MU-PMI and MU-CQIs along with the denoted SU-CQIs to the base station 104.

Optionally, the user 102 may first determine a precoder of rank r along with its SINRs and CQI(s) using SU-MIMO rules. It can then use the precoder so determined to compute additional SINRs and CQI(s) for that precoder using MU-MIMO rules. These additional CQI(s) can then be reported along with the CQI(s) and the PMI determined using the SU-MIMO rules.

Accordingly, in another embodiment of method 300, the receiver 212 of the user 102 can receive S and r from the base station 104 at step 302. At a first sub-step of step 304, the processor 210 can determine a precoder of rank r and can compute (up-to) r SINRs assuming that only r streams with equal power will be scheduled and that no interfering stream will be co-scheduled. Also at the first sub-step, the processor 210 can combine the computed SINRs into one or more CQIs and can denote the index identifying the precoder as "SU-PMI" and the computed CQIs as "SU-CQIs" with corresponding tags. Using the precoder identified by the SU-PMI, at a second sub-step of step 304, the processor 210 can determine additional up-to r SINRs. Here, the processor 210 assumes that there can be S–r co-scheduled interfering streams and that equal power is assigned to all S streams. In addition, also at the second sub-step, the processor 210 can combine the computed SINRs into one or more CQIs and can denote these additional CQIs as MU-CQIs with one or more corresponding tags. At step 306, the processor 210 can direct the transmitter 212 to feed-back the denoted SU-PMI and SU-CQIs along with the denoted along MU-CQIs to the base station 104.

5.1b

Alternatively, after receiving the signal from the base station 104, the user 102 can first use SU-MIMO rules to determine its PMI,RI and corresponding CQI(s) and can denote the rank of the precoder so determined by r'. The user 102 then determines $\hat{r}=\min\{r',r\}$. Further, the user 102 determines a PMI of rank $\hat{r}$ and corresponding SINRs (CQI(s)) using MU-MIMO rules assuming that S–$\hat{r}$ interfering streams may be co-scheduled. The user may then report the CQI(s) and PMI, RI determined via SU-MIMO rules along with the CQI(s) and PMI determined via MU-MIMO rules. As indicated above, the feed back is done in a manner that permits the base station 104 to unambiguously determine the portion determined via SU-MIMO rules and the portion determined via MU-MIMO rules. It should be noted that the rank of the SU-MIMO precoder r' also fixes the rank of the MU-MIMO precoder and hence the MU-MIMO PMI unambiguously determines a precoder. In another variant, only the CQI(s) and PMI determined via MU-MIMO rules may be fed-back along with the rank of the PMI $\hat{r}$.

Accordingly, in another embodiment of method 300, the receiver 212 of the user 102 can receive S and r from the base station 104 at step 302. At a first sub-step of step 304, the processor 210 can determine a rank r' and a precoder of rank r'. Further, at the first sub-step, the processor can compute (up-to) r' SINRs, assuming that only r' streams with equal power will be scheduled and no interfering streams will be co-scheduled. Also at the first sub-step, the processor 210 can combine the computed SINRs into one or more CQIs and can denote the index identifying the precoder as an "SU-PMI," the r' as an "SU-rank" and the computed CQIs as "SU-CQIs" using, for example, corresponding tags. At a second sub-step of step 304, the processor 210 can determine a rank R=min (r,r'), can determine a precoder of rank R and can compute (up-to) R SINRs assuming that there can be S–R co-scheduled interfering streams and that equal power is assigned to all S streams. Also at the second sub-step, the processor 210 can combine the computed SINRs into one or more CQIs and can denote the index identifying the determined precoder as "MU-PMI" and the computed CQIs as "MU-CQIs" using, for example, corresponding tags. At step 306, the processor 210 can direct the transmitter 212 to feed back the denoted MU-PMI and MU-CQIs to the base-station 104 along with the denoted SU-PMI, SU-rank and SU-CQIs.

Optionally, the user 102 may use a precoder, for example, $A \in \mathbb{C}^{M \times r'}$, determined via SU-MIMO rules as follows. First, the rank $\hat{r}=\min\{r', r\}$ is determined and, using $\hat{r}$, a unique M×$\hat{r}$ sub-matrix of A having $\hat{r}$ columns is determined via pre-defined mapping rules that are known in advance to all users and the base station 104 servicing the users. The user 102 then computes additional SINRs and CQI(s) for the sub-matrix so determined using MU-MIMO rules assuming that S–$\hat{r}$ interfering streams may be co-scheduled. These additional CQI(s) can then be reported along with the CQI(s), PMI and RI determined using the SU-MIMO rules.

Accordingly, in another embodiment of method 300, the receiver 212 of the user 102 can receive S and r from the base station 104 at step 302. At a first sub-step of step 304, the processor 210 can determine a rank r' and a precoder of rank r' and can compute (up-to) r' SINRs assuming that only r' streams with equal power will be scheduled and no interfering streams will be co-scheduled. Also at the first sub-step, the processor 210 can combine the computed SINRs into one or more CQIs and can denote the index identifying the precoder as an "SU-PMI," r' as an "SU-rank" and the computed CQIs as "SU-CQIs" using, for example, corresponding tags. At a second sub-step of step 304, the processor 210 can determine a rank R=min(r,r') and can determine a precoder of rank R that is a sub-matrix of the precoder identified by SU-PMI formed by a sub-set of its columns. For the precoder so determined, the processor 210, also at the second sub-step, can compute (up-to) R SINRs assuming that there can be S−R co-scheduled interfering streams and that equal power is assigned to all S streams. Further, at the second sub-step of step 304, the processor 210 can combine the computed SINRs into one or more CQIs and can denote the computed CQIs as "MU-CQIs" using, for example, a corresponding tag. At step 306, the processor 210 can direct the transmitter 212 to feed back the denoted SU-PMI, SU-rank and SU-CQIs along with the denoted MU-CQIs to the base station 104.

It should be noted that, assuming that there can be up to S−r̂ co-scheduled interfering streams, the user 102 can make a more conservative choice by determining the interference covariance matrix to be equal to $$\frac{\rho(S-\hat{r})}{S(M-\hat{r})}H^\dagger(I-GG^\dagger)H$$

(when examining a precoder $G \in C^{M \times \hat{r}}$) while computing its SINRs. In another variant, the user can instead assume that S−r interfering streams will be co-scheduled and make a less conservative choice in determining the interference covariance matrix to be equal to $$\frac{\rho(S-r)}{(S-r+\hat{r})(M-\hat{r})}H^\dagger(I-GG^\dagger)H.$$

While the base station need not be aware of the exact rule used by the user 102, it should be aware of the power-per-stream assumed by the user in computing its SINRs.

5.1c

It should also be noted that any user that does not receive the semi-static signal from the base station 104 can use SU-MIMO rules to determine its CQI(s) and PMI,RI. Such a user only reports the set of CQI(s) and PMI,RI determined via the SU-MIMO rules. In this context, we note that low geometry users (i.e., users whose average received signal strength is below a threshold) are likely not suitable for MU-MIMO pairing and hence need not be semi-statically signaled by the base station 104.

5.2

In accordance with another implementation, the base station 104 can employ semi-static signaling to inform a user 102 of a multi-user power offset α. The parameter α is user-specific. The semi-static signal can optionally include either a suggested per-user MU-MIMO rank r or a maximum per-user MU-MIMO rank $r_{max}$, both of which can be user-specific. Alternatively, the maximum per-user MU-MIMO rank $r_{max}$ can be pre-determined and can be identical for all users and known to them, in which case it need not be conveyed.

Each user 102 can estimate an energy-per-resource-element (RE) or per (RB) parameter ρ. For example, the base station 104 periodically transmits pilot (or reference) symbols on pre-determined positions in the available time-frequency resources, as described in the above-referenced commonly owned and co-pending utility applications. The pilot symbols, as well as the positions, can be known in advance to all users. Each user 102 can then estimate the total transmit power per RE or per RB (ρ) using the signals it receives on these positions. In addition, in accordance with other aspects, the base station 104 can further control each user's estimate of ρ by signaling a user-specific parameter, for example, δ. Then, a user 102 which receives a particular value of δ can multiply its estimated ρ by δ and can employ δρ as the total transmit power ρ per RE or per RB. It should also be noted that, in the implementations described herein above and below, ρ can more broadly be considered to be a constant that is proportional to the maximum bound of the sum power constraint per RE or per RB.

Using the estimated ρ with α, in order to determine a precoder and compute its SINRs under MU-MIMO rules, the user 102 assumes that on each resource element or resource block on which it will be scheduled, a fraction of the energy or power ρα will be used for its desired signal whereas the remaining (1−α)ρ will be used for the interferers.

5.2a

After receiving the semi-static multi-user power offset parameter α, the user 102 computes PMI,CQI(s) and possibly a rank under MU-MIMO rules based on the parameter α. In particular, in order to compute SINR(s) for each choice of a semi-unitary M×r precoder G, the user assumes that the interference covariance matrix is equal to $$\frac{\rho(1-\alpha)}{M-r}H^\dagger(I-GG^\dagger)H$$

and that each of its r desired streams corresponding to the r columns of G are sent with power $$\frac{\alpha\rho}{r}.$$

Note that a value of rank r can also be semi-statically signaled to a user 102 from the base station 104, in which case the user 102 only reports the PMI and CQI(s). Alternatively, the user 102 can itself optimize and choose a value of r (subject to it being no greater than $r_{max}$) in which case the user reports the rank along with the PMI and CQI(s).

Accordingly, in another embodiment of method 300, the receiver 212 of the user 102 can receive α, ρ and r from the base station 104 at step 302. At step 304, the processor 210 determines a precoder of rank r and computes (up-to) r SINRs. Here, the processor 210 assumes αρ to be the sum power assigned to the r streams intended for the user 102 and assumes (1−α)ρ to be the sum power assigned to the interfering streams co-scheduled with the streams intended for the user 102. Also at step 304, the processor 210 combines the computed SINRs into one or more CQIs and denotes the index identifying the precoder as an "MU-PMI" and the computed CQIs as "MU-CQIs," using, for example, corresponding tags. At step 306, the processor 210 directs the transmitter 212 to feed back the denoted MU-PMI and the denoted MU-CQIs to the base station 104.

Optionally, the user 102 may also use SU-MIMO rules to determine another set of CQI(s) and a PMI,RI. It may then report these CQI(s) and PMI,RI along with the CQI(s) and PMI, and possibly a corresponding rank, determined using the MU-MIMO rules. The feed back is done in a manner that permits the base station to unambiguously determine the portion of the feed back determined via SU-MIMO rules and the portion determined via MU-MIMO rules.

Optionally, such a user may use the precoder determined via MU-MIMO rules and then compute additional SINRs and CQI(s) for that precoder using SU-MIMO rules. These additional CQI(s) can then be reported along with the CQI(s) and PMI possibly rank determined using the MU-MIMO rules.

Accordingly, in another embodiment of method 300, the receiver 212 of the user 102 can receive α, ρ and r from the base station 104 at step 302. At a first sub-step of step 304, the processor 210 determines a precoder of rank r and computes (up-to) r SINRs. Here, the processor 210 assumes αρ to be the sum power assigned to the r streams intended for the user 102 and assumes (1−α)ρ to be the sum power assigned to the interfering streams co-scheduled with the streams intended for the user 102. Also at the first sub-step, the process 210 combines the computed SINRs into one or more CQIs and denotes the index identifying the precoder as an "MU-PMI" and the computed CQIs as "MU-CQIs," using, for example, corresponding tags. At a second sub-step of step 304, the processor 210 uses the precoder identified by the MU-PMI to determine additional up-to r SINRs. Here, the processor 210 assumes that only r streams with equal power will be scheduled and no interfering stream will be co-scheduled. Also at the second sub-step, the processor 210 combines the computed SINRs into one or more CQIs and denotes these additional CQIs as "SU-CQIs" using, for example, corresponding tags. At step 306, the processor 210 directs the transmitter 212 to feed back the denoted MU-PMI and MU-CQIs to the base station 104 along with the denoted SU-CQIs.

Optionally, the user 102 may also use SU-MIMO rules to determine a set of CQI(s) and PMI and RI. The RI is determined if no rank is signaled from the base station 104. Further, the rank can be constrained to be no greater than $r_{max}$. The user 102 can then use the precoder so determined to compute additional SINRs and CQI(s) for that precoder using MU-MIMO rules. These additional CQI(s) can then be reported along with the CQI(s), PMI and (possibly) a precoder rank determined using the SU-MIMO rules.

Accordingly, in another embodiment of method 300, the receiver 212 of the user 102 can receive α, ρ and r from the base station 104 at step 302. At a first sub-step of step 304, the processor 210 determines a precoder of rank r and computes (up-to) r SINRs assuming that only r streams with equal power will be scheduled and no interfering stream will be co-scheduled. In addition, at the first sub-step, the processor 210 combines the computed SINRs into one or more CQIs and denotes the index identifying the precoder as an "SU-PMI" and the computed CQIs as "SU-CQIs" using, for example, corresponding tags. At a second sub-step of step 304, the processor 210 employs the precoder identified by the SU-PMI to determine additional up-to r SINRs assuming that αρ is the power assigned to r streams intended for the user 102 and that (1−α)ρ is the power assigned to the co-scheduled interfering streams. Also at the second sub-step, the processor 210 combines computed SINRs into one or more CQIs and denotes these additional CQIs as "MU-CQIs" using corresponding tags. At step 306, the processor 210 directs the transmitter to feed back the denoted SU-PMI and the denoted SU-CQIs to the base-station along with the denoted MU-CQIs 5.2b Alternatively, in accordance with another implementation, after receiving the signal from the base station 104, the user 102 first uses SU-MIMO rules to determine its PMI,RI and corresponding CQI(s). We denote the rank of the precoder so determined by r'. The user 102 then determines r̂=min{r',r} if the per-user MU-MIMO rank r is conveyed by the base station 104. Otherwise, the user determines r̂={r',$r_{max}$}. The user 102 may then determine a PMI of rank r̂ and corresponding SINRs/CQI(s) using MU-MIMO rules. In accordance with these MU-MIMO rules (when examining a precoder G∈$C^{M \times \hat{r}}$), the interference covariance matrix is assumed to be equal to $$\frac{\rho(1-\alpha)}{M-\hat{r}} H^\dagger (I - GG^\dagger) H.$$

The user 102 further assumes that each of the r̂ streams directed to the user 102 and corresponding to the r̂ columns of G are sent with power αρ/r̂. The user 102 may then report the CQI(s) and PMI,RI determined via SU-MIMO rules along with the CQI(s) and PMI determined via MU-MIMO rules. The feed back from the user 102 is performed in a manner that permits the base station to unambiguously determine the portion of the feed back determined via SU-MIMO rules and the portion of the feed back determined via MUMIMO rules. It should be noted that the rank of the SU-MIMO precoder r' also fixes the rank of the MU-MIMO precoder and hence the MU-MIMO PMI unambiguously determines a precoder. In another variant, only the CQI(s) and PMI determined via MU-MIMO rules may be fed back along with the rank of the PMI r̂.

Accordingly, in another embodiment of method 300, the receiver 212 of the user 102 can receive α, ρ and r from the base station 104 at step 302. At a first sub-step of step 304, the processor 210 determines a rank r' and a precoder of rank r'. The processor 210 also computes (up-to) r' SINRs assuming that only r' streams with equal power will be scheduled and no interfering streams will be co-scheduled. In addition, the processor 210 at the first sub-step combines the computed SINRs into one or more CQIs and denotes the index identifying the precoder as an "SU-PMI," the r' as an "SU-rank" and the computed CQIs as "SU-CQIs" using, for example, corresponding tags. At a second sub-step of step 304, the processor 210 determines a rank R=min(r,r') and determines a precoder of rank R. Further, at the second sub-step, the processor 210 computes (up-to) R SINRs assuming that αρ is the sum power assigned to the R streams directed to the user 102 and that (1−α)ρ is the sum power assigned to the co-scheduled interfering streams. In addition, the processor combines computed SINRs into one or more CQIs and denotes the index identifying the determined precoder as an "MU-PMI" and the computed CQIs as "MU-CQIs" using, for example, corresponding tags. At step 306, the processor 210 directs the transmitter 212 to feed back the denoted MU-PMI and MU-CQIs to the base station 104 along with the denoted SU-PMI, SU-rank and SU-CQIs.

Optionally, the user 102 may use the precoder, say A∈$C^{M \times r'}$, determined via SU-MIMO rules as follows. First the rank r̂=min{r', r} (or r̂={r',$r_{max}$}) is determined and, using it, a unique M×r̂ sub-matrix of A having r̂ columns is determined via pre-defined mapping rules that are known in advance to the base station 104 and all users served by the base station. The sub-matrix is denoted by B. The user 102 then computes additional SINRs and CQI(s) using MU-MIMO rules assuming that the interference covariance matrix is equal to $$\frac{\rho(1-\alpha)}{M-\hat{r}} H^\dagger (I - BB^\dagger) H$$

and that each of the r̂ streams directed to the user 102 and corresponding to the r̂ columns of B are sent with power αρ/r̂.

The user 102 can then report these additional CQI(s) along with the CQI(s) and PMI and RI determined using the SU-MIMO rules to the base station 104.

Accordingly, in another embodiment of method 300, the receiver 212 of the user 102 can receive α, ρ and r from the base station 104 at step 302. At a first sub-step of step 304, the processor 210 determines a rank r', a precoder of rank r' and computes (up-to) r' SINRs assuming that only r' streams with equal power will be scheduled and no interfering streams will be co-scheduled. Also at the first sub-step, the processor 210 combines the computed SINRs into one or more CQIs and denotes the index identifying the precoder as an "SU-PMI," denotes the rank r' as an "SU-rank" and denotes the computed CQIs as "SU-CQIs" using for example, corresponding tags. At a second sub-step of step 304, the processor 210 determines a rank R=min(r,r') and determines a precoder of rank R that is a sub-matrix of the precoder identified by the SU-PMI and is formed by a sub-set of the columns of the precoder identified by the SU-PMI. For the precoder of rank R so determined, the processor 210 computes (up-to) R SINRs assuming that αρ is the sum power assigned to the R streams directed to the user 102 and that (1−α)ρ is the sum power assigned to the co-scheduled interfering streams. Also at the second sub-step, the processor 210 combines the computed SINRs into one or more CQIs and denotes the computed CQIs as "MU-CQIs" using, for example, corresponding tags. At step 306, the processor 210 directs the transmitter 212 to feed back the denoted SU-rank, SU-PMI and SU-CQIs to the base station 104 along with the denoted MU-CQIs.

5.2c

It should be noted that any user that does not receive the semi-static signal from the base station uses the SU-MIMO rules to determine its CQI(s) and PMI,RI. Such a user only reports the set of CQI(s) and PMI,RI determined via the SU-MIMO rules. In this context, we note that low geometry users (i.e., users whose average received signal strength is below a threshold) are likely not suitable for MU-MIMO pairing and hence need not be semi-statically signaled by the base station 104.

It should also be noted that in all cases when feeding back both SU-CQI(s) and MU-CQI(s), the user 102 can exploit differential feed back to reduce the feed back overhead. For example, the user 102 can feed back an MU-CQI (SU-CQI) along with a differential CQI such that the sum (difference) of the MU-CQI (SU-CQI) and the differential CQI yields a corresponding SU-CQI (MU-CQI).

Furthermore, in order to maximize scheduling gain, complete SU feed back (PMI,RI and CQI(s)) computed under SU-MIMO rules and MU-feed back (PMI, CQI(s) and possibly rank) computed under MU-MIMO rules should be permitted. However, this would impose a very high feed back burden. Thus, several options that seek to achieve the ideal scheduling performance but with reduced feed back overhead have been described above. For example, as noted above, the complete SU-feed back can be provided with reduced MU-feed back. This is made possible by forcing the MU-rank r̂ to be equal to min{r',r} (or r̂=min{r', $r_{max}$}) where r' is the computed SU-rank. This is sensible, as r' is the optimal rank that the user 102 deems it can support in the absence of intra-cell interference from co-scheduled streams. Thus, the rank in the presence of possible intra-cell interference should not exceed it. To further reduce feed back overhead, as indicated above, the MU-precoder can be a unique sub-matrix of the SU-precoder (i.e., the precoder determined under SU-MIMO rules). This will lead to a negligible performance degradation when r'≤r (or r'≤$r_{max}$), as the SU-precoder will be a reasonably good choice because it approximates the first r' dominant right singular vectors of $H^\dagger$. Along similar lines, only one set of complete MU feed back can be sent accompanied by additional CQI(s) computed under SU-MIMO rules for the MU-precoder, as described above.

It should further be noted that other embodiments of method 300 can be employed using aspects described above. For example, in one such embodiment of method 300, the receiver 212 of the user 102 can receive α, ρ and $r_{max}$ from the base station 104 at step 302. At step 304, the processor 210 determines a rank r (no greater than $r_{max}$) and a precoder of rank r. In addition, the processor 210 computes (up-to) r SINRs assuming that αρ is the sum power assigned to r streams directed to the user 102 and that (1−α)ρ is the sum power assigned to the co-scheduled interfering streams. Further, also at step 304, the processor 210 combines the computed SINRs into one or more CQIs and denotes the index identifying the precoder as an "MU-PMI," denotes the rank r as an "MU-rank" and denotes the computed CQIs as "MU-CQIs" using, for example, corresponding tags. At step 306, the processor 210 directs the transmitter 212 to feed back the denoted the denoted MU-rank, MU-PMI and MU-CQIs to the base station 104.

In another embodiment of method 300, the receiver 212 of the user 102 can receive α, ρ and $r_{max}$ from the base station 104 at step 302. At a first sub-step of step 304, the processor 210 determines a rank r (no greater than $r_{max}$) and a precoder of rank r. In addition, the processor 210 computes (up-to) r SINRs assuming that αρ is the sum power assigned to the r streams directed to the user 102 and that (1−α)ρ is the sum power assigned to the co-scheduled interfering streams. Also at the first sub-step, the processor 210 combines the computed SINRs into one or more CQIs and denotes the index identifying the precoder as an "MU-PMI," denotes the rank r as an "MU-rank" and denotes the computed CQIs as "MU-CQIs" using, for example, corresponding tags. At a second sub-step of step 304, the processor 210 uses the precoder identified by the MU-PMI to determine additional up-to r SINRs assuming that only r streams with equal power will be scheduled and no interfering stream will be co-scheduled. Also at the second sub-step, the processor 210 combines the computed SINRs into one or more CQIs and denotes these additional CQIs as "SU-CQIs" using, for example, corresponding tags. At step 306, the processor 210 directs the transmitter 212 to feed back the denoted MU-rank, MU-PMI and MU-CQIs to the base station 104 along with the denoted SU-CQIs.

In an alternative embodiment of method 300, the receiver 212 of the user 102 can receive α, ρ and $r_{max}$ from the base station 104 at step 302. At a first sub-step of step 304, the processor 210 determines a precoder of rank r (no greater than $r_{max}$) and computes (up-to) r SINRs assuming that only r streams with equal power will be scheduled and no interfering stream will be co-scheduled. Also at the first sub-step, the processor 210 combines the computed SINRs into one or more CQIs and denotes the index identifying the precoder as an "SU-PMI," the rank r as an "SU-rank" and the computed CQIs as "SU-CQIs" using, for example, corresponding tags. At a second sub-step of step 304, the processor 210 uses the precoder identified by the SU-PMI to determine additional up-to r SINRs assuming that αρ is the power assigned to the r streams directed to the user 102 and that (1−α)ρ is the power assigned to the co-scheduled interfering streams. Also at the second sub-step, the processor 210 combines the computed SINRs into one or more CQIs and denotes these additional CQIs as "MU-CQIs" using, for example, corresponding tags. At step 306, the processor 210 directs the transmitter 212 to feed back the denoted SU-rank, SU-PMI and SU-CQIs to the base station 104 along with the denoted MU-CQIs.

6. Additional Signaling Schemes

In the signaling schemes described above, the base station 104 and the user 102 can communicate various parameters to enable the base station 104 to determine scheduling parameters based on a relatively accurate estimate of channel conditions. It should be noted that other parameters and/or combinations of parameters can be communicated between the base station 104 and the user 102 to improve the accuracy of the CQIs and PMIs determined in the system. In particular, the fraction α of the total transmit power that will be used for a user's desired signal, the total number of streams S and an estimate (r) of or an upper bound on ($r_{max}$) a suggested rank can be signaled from the base station 104 to the user 102 to permit the user 102 to determine the PMI and/or CQIs using the equations described in detail above. The parameters signaled by the base-station to a user 102 are interpreted by that user 102 in particular ways that are described in detail herein below. Similarly, some assumptions made by the user 102 in computing its feed back report (such as the assumed power-per-data-stream) should be known to the base-station 104. Moreover, as described below, the feed back sent by the user 102 should permit the base station 104 to unambiguously determine the portion of the feed back determined by the user via SU-MIMO rules and the portion of the feed back determined via MU-MIMO rules.

6.1

In accordance with one implementation, the base station 104 can employ feed-forward signaling to inform a user 102 of an estimate of or an upper bound on the total number of streams, S, that the base station expects to co-schedule on one or more sub-bands. The signaling can also include a suggested per-user MU-MIMO rank r. In addition, the signaling can further include a multi-user power offset α1. Moreover, each user 102 can estimate an energy-per-resource-element or per-resource-block parameter ρ. While computing its SINRs, the user 102 uses ρ as an estimate of the total transmit power that the base station 104 will apply on a time-frequency resource element or block. For example, the user 102 can estimate ρ as described above.

6.1a

After receiving the signal from the base station 104, the user 102 can compute the PMI/CQI under MU-MIMO rules. In particular, the user 102 can determine a precoder of rank-r (that is no greater than S') from a codebook of rank-r matrices, where the precoder is uniquely identified by the rank r, and a PMI, along with corresponding SINRs, which are combined into one or more CQI(s). The user 102 can report the PMI and the CQI(s) to the base station 104. While the exact rule is an implementation matter, the aim of such a rule is to account for the post-scheduling interference using the knowledge that (up-to) S−r interfering streams may be co-scheduled. Such a rule can also assume that a fraction α of the transmit power ρ will be used for the r streams directed to the user 102 that are transmitted along the r columns of the precoder being examined, whereas the remaining part (1−α)ρ will be used to transmit the S−r co-scheduled interfering streams. In particular, for each choice of a semi-unitary M×r precoder G, the user can assume that the desired r streams (transmitted along the r columns of G) will share the fraction α of the transmit power equally, whereas the interfering S−r streams (transmitted along vectors that are mutually orthogonal and lie in the null space of $G^{\dagger}$) will share the remaining fraction 1−α of the transmit power equally. It should be noted that the case α<1 and S=r should either be avoided or, in this case, the user 102 can ignore α and instead assume α=1 or some pre-determined value, which implies that there is no need to signal α for S=r.

Accordingly, in one embodiment of method 300, the receiver 212 of the user 102 can receive S, α, and r from the base station 104 at step 302. At step 304, the processor 210 determines a precoder of rank r and computes (up-to) r SINRs assuming that the fraction α of the transmit power is assigned to the r streams directed to the user 102 and that the remaining fraction (1−α) of the transmit power is assigned to the co-scheduled S−r interfering streams. In addition, also at step 304, the processor 210 combines the computed SINRs into one or more CQIs and denotes the index identifying the precoder as an "MU-PMI" and the computed CQIs as "MU-CQIs" using, for example, corresponding tags. At step 306, the processor 210 directs the transmitter 212 to feed back the denoted MU-PMI and MU-CQIs to the base station 104.

Optionally, the user 102 may also use SU-MIMO rules to determine another set of CQI(s) and PMI and rank index (RI). Here, the user 102 assumes that all the transmit power will be shared equally among the desired streams. Further, the user 102 assumes that no other stream intended for another user will be co-scheduled. The user 102 also determines a precoder (which is uniquely identified by an RI and a PMI) along with the corresponding SINRs. The user 102 may then combine these SINRs into one or more CQI(s) and report these CQI(s) and PMI,RI along with the CQI(s) and PMI determined using the MU-MIMO rules. The feed back is done in a manner that permits the base station 104 to unambiguously determine the portion of the feed back determined via SU-MIMO rules and the portion of the feed back determined via MU-MIMO rules.

Optionally, the user 102 may use the precoder determined via MU-MIMO rules and may then compute additional SINRs and CQI(s) for that precoder using SU-MIMO rules. These additional CQI(s) can then be reported along with the CQI(s) and PMI determined using the MU-MIMO rules.

Accordingly, in another embodiment of method 300, the receiver 212 of the user 102 can receive S, α, and r from the base station 104 at step 302. At a first sub-step of step 304, the processor 210 determines a precoder of rank r and computes (up-to) r SINRs assuming that the fraction α of the transmit power is assigned to the r streams directed to the user 102 and that the remaining fraction (1−α) of the transmit power is assigned to the co-scheduled S−r interfering streams. In addition, the processor 210 combines computed SINRs into one or more CQIs and denotes the index identifying the precoder as an "MU-PMI" and the computed CQIs as "MU-CQIs" using, for example corresponding tags. At a second sub-step of step 304, the processor 210 employs the precoder identified by the MU-PMI to determine additional up-to r SINRs assuming that only r streams with equal power will be scheduled and that no interfering stream will be co-scheduled. Further, the processor 210 combines the computed SINRs into one or more CQIs and denotes these additional CQIs as "SU-CQIs" using, for example, corresponding tags. At step 306, the processor 210 directs the transmitter 212 to feed back the denoted MU-PMI and MU-CQIs to the base station 104 along with the denoted SU-CQIs.

Optionally, the user 102 may first determine a precoder of rank r along with its SINRs and CQI(s) using SU-MIMO rules. The user 102 can then use the precoder so determined and can compute additional SINRs and CQI(s) for that precoder using MU-MIMO rules. These additional CQI(s) can then be reported along with the CQI(s) and PMI determined using the SU-MIMO rules.

Accordingly, in another embodiment of method 300, the receiver 212 of the user 102 can receive S, α, and r from the base station 104 at step 302. At a first sub-step of step 304, the processor 210 determines a precoder of rank r and computes (up-to) r SINRs assuming that only r streams with equal power will be scheduled and that no interfering stream will be co-scheduled. The processor 210 combines computed SINRs into one or more CQIs and denotes the index identifying the precoder as an "SU-PMI" and the computed CQIs as "SU-CQIs" using, for example, corresponding tags. At a second sub-step of step 304, the processor 210 employs the precoder identified by the SU-PMI and determines additional up-to r SINRs assuming that the fraction α of the transmit power is assigned to the r streams directed to the user 102 and that the remaining fraction (1−α) of the transmit power is assigned to the co-scheduled S−r interfering streams. The user 102 also combines computed SINRs into one or more CQIs and denotes these additional CQIs as "MU-CQIs" using, for example corresponding tags. At step 306, the processor 210 directs the transmitter 212 to feed back the denoted SU-PMI and SU-CQIs to the base station 104 along with the denoted MU-CQIs.

6.1b

Alternatively, after receiving the signal from the base station 104, the user 102 first uses SU-MIMO rules to determine its PMI,RI and corresponding CQI(s). The rank of the precoder so determined is denoted by r'. The user 102 then determines $\hat{r}=\min\{r', r\}$. Further, the user 102 determines a PMI identifying a (MU-)precoder of rank $\hat{r}$ and determines corresponding SINRs (CQI(s)) using MU-MIMO rules assuming that S−$\hat{r}$ interfering streams may be co-scheduled and that a fraction α of the transmit power will be shared equally among the desired $\hat{r}$ streams (transmitted along the columns of the reported MU-precoder) and the remaining fraction 1−α of the transmit power will be shared equally among the co-scheduled S−$\hat{r}$ streams. The S−$\hat{r}$ streams are, in turn, transmitted along mutually orthogonal vectors that are also orthogonal to the columns of the reported MU-precoder. The user 102 may then report the CQI(s) and PMI,RI determined via SU-MIMO rules along with the CQI(s) and PMI determined via MU-MIMO rules. The feed back is done in a manner that permits the base station 104 to unambiguously determine the portion of the feed back determined via SU-MIMO rules and the portion of the feed back determined via MU-MIMO rules. It should be noted that the rank of the SU-MIMO precoder r' also fixes the rank of the MU-MIMO precoder and hence the MU-MIMO PMI unambiguously determines a precoder. In another variant, only the CQI(s) and PMI determined via MU-MIMO rules may be fed back along with the rank of the PMI $\hat{r}$.

Accordingly, in another embodiment of method 300, the receiver 212 of the user 102 can receive S, α, and r from the base station 104 at step 302. At a first sub-step of step 304, the processor 210 determines a rank r', a precoder of rank r' and computes (up-to) r' SINRs assuming that only r' streams with equal power will be scheduled and that no interfering streams will be co-scheduled. The processor 210 also combines computed SINRs into one or more CQIs and denotes the index identifying the precoder as an "SU-PMI," denotes the rank r' as an "SU-rank" and denotes the computed CQIs as "SU-CQIs" using, for example, corresponding tags. At a second sub-step of step 304, the processor 210 determines a rank R=min(r,r') and determines a precoder of rank R. The processor 210 further computes (up-to) R SINRs assuming that the fraction α of the transmit power is assigned to the R streams directed to the user 102 and that the remaining fraction (1−α) of the transmit power is assigned to the co-scheduled S−R interfering streams. Also at the second sub-step, the processor 210 combines the computed SINRs into one or more CQIs and denotes the index identifying the determined precoder as an "MU-PMI" and the computed CQIs as "MU-CQIs" using, for example, corresponding tags. At step 306, the processor 210 directs the transmitter 212 to feed back the denoted MU-PMI and MU-CQIs to the base station 104 along with the denoted SU-PMI, SU-rank and SU-CQIs.

Optionally, such the user 102 may use the precoder, for example, $A \in C^{M \times r'}$, determined via SU-MIMO rules as follows. First, the user 102 determines the rank $\hat{r}=\min\{r', r\}$. Using the rank $\hat{r}$, the user 102 determines an MU-precoder as a unique M×$\hat{r}$ sub-matrix of A having $\hat{r}$ columns. The sub-matrix is determined via pre-defined mapping rules that are known in advance to all users and the base station 104 serving the users. The user 102 then computes additional SINRs and CQI(s) for the sub-matrix so determined using MU-MIMO rules assuming that S−$\hat{r}$ interfering streams may be co-scheduled and that a fraction α of the transmit power will be shared equally among the $\hat{r}$ streams (transmitted along the columns of the determined MU-precoder) directed to the user and that the remaining fraction 1−α of the transmit power will be shared equally among the co-scheduled S−$\hat{r}$ streams. The S−$\hat{r}$ stream are transmitted along mutually orthogonal vectors that are also orthogonal to the columns of the MU-precoder. The user 102 can report these additional CQI(s) along with the CQI(s), PMI and RI determined using the SU-MIMO rules.

Here, it is noted that, in another variant, the user 102 can instead assume that the remaining fraction 1−α of the transmit power will be shared equally among S−r co-scheduled streams which are transmitted along mutually orthogonal vectors that are also orthogonal to the columns of the MU-precoder. While the base station 104 need not be aware of the exact rule used by the user, it should be aware of the fraction of the power the user assumes for each of its desired streams while computing its SINRs.

Accordingly, in another embodiment of method 300, the receiver 212 of the user 102 can receive S, α, and r from the base station 104 at step 302. At a first sub-step of step 304, the processor 210 determines a rank r' and a precoder of rank r'. The processor 210 also computes (up-to) r' SINRs assuming that only r' streams with equal power will be scheduled and that no interfering streams will be co-scheduled. Also at the first sub-step, the processor 210 combines the computed SINRs into one or more CQIs and denotes the index identifying the precoder as an "SU-PMI," the rank r' as an "SU-rank" and the computed CQIs as "SU-CQIs" using, for example, corresponding tags. At a second sub-step of step 304, the processor 210 determines a rank R=min(r,r') and determines a precoder of rank R that is a sub-matrix of the precoder identified by the SU-PMI is formed by a sub-set of the SU-precoder columns. For the precoder of rank R so determined, the processor 210 computes (up-to) R SINRs assuming that the fraction α of the transmit power is assigned to the R streams directed to the user 102 and that the remaining fraction (1−α) of the transmit power is assigned to the co-scheduled S−R interfering streams. Also at the second sub-step, the processor 210 combines the computed SINRs into one or more CQIs and denotes the computed CQIs as "MU-CQIs" using, for example, a corresponding tag. At step 306, the processor 210 directs the transmitter 212 to feed back the denoted SU-rank, SU-PMI and SU-CQIs to the base station 104 along with the denoted MU-CQIs.

6.1c

Any user that does not receive the semi-static signal from the base station 104 uses SU-MIMO rules to determine its CQI(s) and PMI,RI. Such a user only reports the set of CQI(s) and PMI,RI determined via the SU-MIMO rules. In this context, it is noted that low geometry users (i.e., users whose average received signal strength is below a threshold) are likely not suitable for MU-MIMO pairing and hence need not be semi-statically signaled by the base station 104.

6.2

In accordance with another implementation, the base station 104 can employ feed-forward signaling to inform a user 102 about an estimate of (or an upper bound on) the total number of streams, S, that the base station 104 expects to co-schedule on at least one sub-band. The signaling can also include a maximum per-user MU-MIMO rank $r_{max}$. In addition, the signaling can include a multi-user power offset $\alpha$. Each user 102 can estimate an energy-per-resource-element or block parameter $\rho$. While computing its SINRs, the user 102 uses $\rho$ as an estimate of the total transmit power that the base station 104 will apply on a time-frequency resource element or block.

6.2a

After receiving the signal from the base station 104, the user 102 computes RI, PMI/CQI under MU-MIMO rules. In particular, the user 102 can determine a precoder of rank $\tilde{r}$ (that is no greater than $r_{max}$) from a codebook of rank-$\tilde{r}$ matrices (the precoder being uniquely identified by the rank $\tilde{r}$ and a PMI) along with corresponding SINRs (which are combined into one or more CQI(s)). Further, the user 102 can report the rank $\tilde{r}$, the PMI and the CQI (s) to the base station 104. While the exact rule is an implementation matter, the aim of such a rule is to account for the post-scheduling interference using the knowledge that (up-to) S–$\tilde{r}$ interfering streams may be co-scheduled. Such a rule can also assume that a fraction $\alpha$ of the transmit power $\rho$ will be used for the $\tilde{r}$ streams directed to the user 102 that are transmitted along the $\tilde{r}$ columns of the precoder being examined, whereas the remaining part $(1-\alpha)\rho$ will be used to transmit the S–$\tilde{r}$ co-scheduled interfering streams. In particular, for each choice of a semi-unitary M×$\tilde{r}$ precoder G, the user 102 can assume that the desired $\tilde{r}$ streams (transmitted along the r columns of G) will share the fraction $\alpha$ of the transmit power equally, whereas the interfering S–$\tilde{r}$ streams (transmitted along vectors that are mutually orthogonal and lie in the null space of $G^\dagger$) will share the remaining fraction $1-\alpha$ of the transmit power equally. The setting S≤$r_{max}$ should either be avoided or, in this case, the user 102 can assume $r_{max}$=S. Moreover, in evaluating a precoder of rank equal to S (which is possible when $r_{max}$=5), the user 102 can instead assume $\alpha$=1 or some pre-determined value. For most rules, the user will then report a precoder of rank S so that the system can choose to configure the user to not report or feed back a rank in this case. Here, the rank will be assumed to be S.

Accordingly, in another embodiment of method 300, the receiver 212 of the user 102 can receive S, $\alpha$, and $r_{max}$ from the base station 104 at step 302. At step 304, the processor 210 determines a rank r (no greater than $r_{max}$) and a precoder of rank r. Further, the processor 210 computes (up-to) r SINRs assuming that the fraction $\alpha$ of the transmit power is assigned to the r streams directed to the user 102 and that the remaining fraction $(1-\alpha)$ of the transmit power is assigned to the co-scheduled S–r interfering streams. In addition, the processor 210 combines computed SINRs into one or more CQIs and denotes the index identifying the precoder as an "MU-PMI," denotes the rank r as an "MU-rank" and denotes the computed CQIs as "MU-CQIs" using, for example, corresponding tags. At step 306, the processor 210 directs the transmitter 212 to feed back the denoted MU-rank, MU-PMI and MU-CQIs to the base station 104 along with the denoted SU-CQIs.

Optionally, the user 102 may also use SU-MIMO rules to determine another set of CQI(s), a PMI and a rank index (RI). In particular, the user 102 assumes that no other stream intended for another user will be co-scheduled and then determines a precoder (which is uniquely identified by an RI and a PMI) along with the corresponding SINRs. The user 102 may then combine these SINRs into one or more CQI(s) and may report these CQI(s) and PMI,RI along with the CQI(s) and PMI,RI determined using the MU-MIMO rules. The feed back is done in a manner that permits the base station to unambiguously determine the portion of the feed back determined via SU-MIMO rules and the portion of the feed back determined via MU-MIMO rules.

Optionally, the user 102 may use the precoder determined via MU-MIMO rules and may then compute additional SINRs and CQI(s) for that precoder using SU-MIMO rules. The user 102 can then report these additional CQI(s) along with the CQI(s) and PMI,RI determined using the MU-MIMO rules.

Accordingly, in another embodiment of method 300, the receiver 212 of the user 102 can receive S, $\alpha$, and $r_{max}$ from the base station 104 at step 302. At a first sub-step of step 304, the processor 210 determines a rank r (no greater than $r_{max}$) and a precoder of rank r. In addition, the processor 210 computes (up-to) r SINRs assuming that the fraction $\alpha$ of the transmit power is assigned to the r streams directed to the user 102 and that the remaining fraction $(1-\alpha)$ of the transmit power is assigned to the co-scheduled S–r interfering streams. Further, the processor 210 combines computed SINRs into one or more CQIs and denotes the index identifying the precoder as an "MU-PMI," denotes the rank r as an "MU-rank" and the computed CQIs as "MU-CQIs" using, for example, corresponding tags. At a second sub-step of step 304, the processor 210 employs the precoder identified by the MU-PMI to determine additional up-to r SINRs assuming that only r streams with equal power will be scheduled and that no interfering stream will be co-scheduled. Also at the second sub-step, the processor 210 combines the computed SINRs into one or more CQIs and denotes these additional CQIs as "SU-CQIs" using, for example, a corresponding tag. At step 306, the processor 210 directs the transmitter 212 to feed back the denoted MU-rank, MU-PMI and MU-CQIs to the base station 104 along with the denoted SU-CQIs.

Optionally, the user 102 may first determine a precoder of rank $\tilde{r}$ (that is no greater than $r_{max}$) along with its SINRs and CQI(s) using SU-MIMO rules. It can then use the precoder so determined and can compute additional SINRs and CQI(s) for that precoder using MU-MIMO rules. The user 102 can report these additional CQI(s) along with the CQI(s) and PMI,RI determined using the SU-MIMO rules to the base station 104.

Accordingly, in another embodiment of method 300, the receiver 212 of the user 102 can receive S, $\alpha$, and $r_{max}$ from the base station 104 at step 302. At a first sub-step of step 304, the processor 210 determines a precoder of rank r (no greater than $r_{max}$) and computes (up-to) r SINRs assuming that only r streams with equal power will be scheduled and that no interfering stream will be co-scheduled. Also at the first sub-step, the processor 210 combines the computed SINRs into one or more CQIs and denotes the index identifying the precoder as an "SU-PMI," denotes the rank r as an "SU-rank" and denotes the computed CQIs as "SU-CQIs" using, for example corresponding tags. At a second sub-step of step 304, the processor 210 employs the precoder identified by the SU-PMI to determine additional up-to r SINRs assuming that the fraction $\alpha$ of the transmit power is assigned to the r streams directed to the user 102 and that the remaining fraction $(1-\alpha)$ of the transmit power is assigned to the co-scheduled S–r interfering streams. In addition, the processor 210 combines the computed SINRs into one or more CQIs and denotes these additional CQIs as "MU-CQIs" using, for example, a corresponding tag. At step 306, the processor 210 directs the transmitter 212 to feed back the denoted SU-rank, SU-PMI and SU-CQIs to the base station 104 along with the denoted MU-CQIs 6.2b Alternatively, after receiving the signal from the base station 104, the user 102 first uses SU-MIMO rules to determine its PMI,RI and corresponding CQI(s). The rank of the precoder so determined is denoted by r'. The user 102 then determines $\hat{r}=\min\{r', r_{max}\}$. Further, the user 102 determines a PMI identifying a (MU-)precoder of rank $\hat{r}$ and corresponding SINRs (CQI(s)) using MU-MIMO rules assuming that S–$\hat{r}$ interfering streams may be co-scheduled and that a fraction α of the transmit power will be shared equally among the desired $\hat{r}$ streams (transmitted along the columns of the reported MU-precoder) directed to the user 102 and that the remaining fraction 1–α of the transmit power will be shared equally among the co-scheduled S–$\hat{r}$ streams. The S–$\hat{r}$ streams are transmitted along mutually orthogonal vectors that are also orthogonal to the columns of the reported MU-precoder. The user 102 may then report the CQI(s) and PMI,RI determined via SU-MIMO rules along with the CQI(s) and PMI determined via MU-MIMO rules to the base station 104. The feed back is done in a manner that permits the base station 104 to unambiguously determine the portion of the feed back determined via SU-MIMO rules and the portion of the feed back determined via MU-MIMO rules. It should be noted that the rank of the SU-MIMO precoder r' also fixes the rank of the MU-MIMO precoder and hence the MU-MIMO PMI unambiguously determines a precoder. In another variant, the user 102 only feeds back the CQI(s) and PMI determined via MU-MIMO rules along with the rank $\hat{r}$ of the PMI.

Optionally, the user 102 may use the precoder, for example, $A \in C^{M \times r'}$, determined via SU-MIMO rules as follows. First, the user 102 determines the rank $\hat{r}=\min\{r', r_{max}\}$. The user 102 uses the rank $\hat{r}$ to determine an MU-precoder that is a unique M×$\hat{r}$ sub-matrix of A having $\hat{r}$ columns. The sub-matrix is determined via pre-defined mapping rules that are known in advance to all users and the base-station 104 serving the users. The user 102 then computes additional SINRs and CQI(s) for the sub-matrix so determined using MU-MIMO rules assuming that S–$\hat{r}$ interfering streams may be co-scheduled and that a fraction α of the transmit power will be shared equally among the desired $\hat{r}$ streams (transmitted along the columns of the determined MU-precoder) and the remaining fraction 1–α of the transmit power will be shared equally among the co-scheduled S–$\hat{r}$ streams. The S–$\hat{r}$ streams are transmitted along mutually orthogonal vectors that are also orthogonal to the columns of the MU-precoder. The user 102 can report these additional CQI(s) along with the CQI(s) and PMI,RI determined using the SU-MIMO rules.

Here, it should be noted that, in another variant, the user 102 can instead assume that the remaining fraction 1–α of the transmit power will be shared equally among S–$r_{max}$ co-scheduled streams which are transmitted along mutually orthogonal vectors that are also orthogonal to the columns of the MU-precoder. While the base station 104 need not be aware of the exact rule used by the user 102, it should be aware of the fraction of the power the user 102 assumes for each of the streams directed to it while computing its SINRs.

6.2c

Any user that does not receive the semi-static signal from the base station uses the SU-MIMO rules to determine its CQI(s) and PMI,RI. Such a user only reports the set of CQI(s) and PMI,RI determined via the SU-MIMO rules. In this context, it is noted that low geometry users (i.e., users whose average received signal strength is below a threshold) are likely not suitable for MU-MIMO pairing and hence need not be semi-statically signalled by the base station.

6.3

In aforementioned implementations, such as those described above in section 6.2, the parameter α can be a vector α of length $r_{max}$ such that, while determining the SINRs under MU-rules for a precoder of rank s, $1 \leq s \leq r_{max}$, the user 102 uses α(s) as the fraction. In addition, in both the aforementioned cases in sections 6.1 and 6.2, the base station 102 can signal another vector $\alpha^{SU}$ to the user 102 such that, in determining the SINRs under SU-rules for a precoder of rank s, the user 102 assumes that the total transmit power used to transmit its desired signals is $\alpha^{SU}(s)\rho$ and that no other stream intended for any other user is co-scheduled.

It should be noted that in the feed-forward signaling of S, r, α, (or S, $r_{max}$, α) in order to reduce the signaling overhead, the system can use different time-periods for signaling these three variables. In other words, the three variables need not always be jointly signaled and each feedforward signal can include a subset of the three variables. The periods and the choice of subset in each feedforward signal can be configured by the base station 104 and then informed to the user 102 via the downlink 205. In such a case, while computing its feed back report to the base station 104, the user 102 will use the most recently received value of each of the three variables. Also, in case any subset of these variables are pre-determined and fixed and are known to/stored by all users and the base station 104 serving the users, that subset need not be signaled.

Similarly, the system can use steps to reduce the signaling overhead involved in the feed back reports, where, for example, each SU-report consists of SU-rank, SU-PMI and SU-CQIs, and each MU-report consists of MU-rank, MU-PMI and MU-CQIs.

One such step includes feeding back the complete SU-report with a reduced MU-feed back. This is made possible by forcing the MU-rank $\hat{r}$ to be equal to min{r',r} (or min {r', $r_{max}$}), where r' is the computed SU-rank. This is sensible, as r' is the optimal rank that the user 102 deems it can support in the absence of intra-cell interference from co-scheduled streams. Thus, the rank in the presence of possible intra-cell interference should not exceed it.

To further reduce feed back overhead, as indicated above, the MU-precoder can be made to be a unique sub-matrix of the SU-precoder (i.e., the precoder determined under SU-MIMO rules) that is determined via pre-defined mapping rules. This will lead to a negligible performance degradation when r'≤r (or r'≤$r_{max}$), as the SU-precoder will be a reasonably good choice because it approximates the first r' dominant right singular vectors of $H^\dagger$. Along similar lines, only one set of complete MU feed back can be fed back accompanied by additional CQI(s) computed under SU-MIMO rules for the MU-precoder.

Another approach that can be used for the MU and/or SU report is to employ a longer feed back period for the rank compared to the feed back periods of the respective PMI and CQI(s). Moreover, a feed back period for the PMI that is longer than the feed back period of the respective CQI(s) can be used. In such a case, while computing its scheduling decisions, the base station 104 will use the most recently received respective values of each variable in the report.

Figure 4:
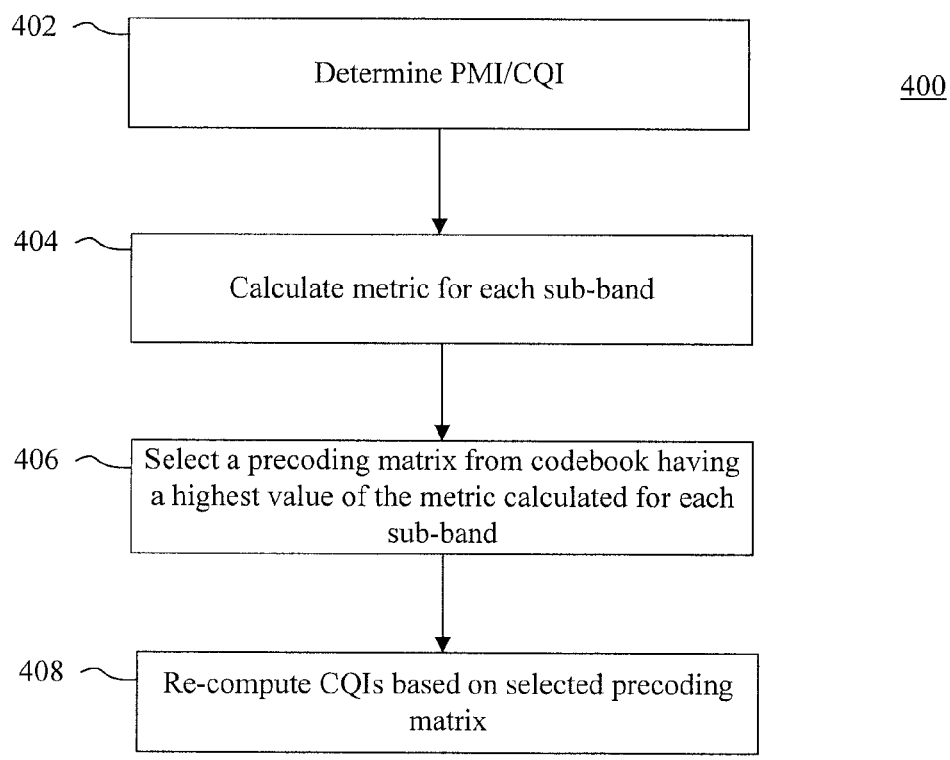
FIG. 4 is a flow diagram of an exemplary method for determining a wideband precoder and corresponding channel quality indices.

In addition, the system can restrict the user 102 to report one wideband PMI along with sub-band CQI(s). The sub-band PMI selection and sub-band CQI computation rules can be modified in a straightforward manner to obtain the wide-band PMI selection and sub-band CQI computation rules. For example, with reference to FIG. 4, with continuing reference to FIGS. 2-3, an exemplary method 400 for determining a wideband precoder and corresponding channel quality indices is illustrated. The method 400 can be performed at step 304 of the method 300 described above. The method 400 can begin at step 402, in which the processor 210 can use sub-band PMI selection and sub-band CQI computation rules to determine a PMI and CQI(s), as described above, for each sub-band. At step 404, the processor 210 can calculate a metric for each sub-band. For example, the processor 210 can calculate a sum rate for each sub-band. At step 406, the processor 210 can then select the PMI of the sub-band yielding a highest metric for use as the wideband PMI. At step 408, using the precoder identified by this PMI, the processor 210 can re-compute the sub-band CQI(s) using the sub-band CQI computation rules described above. The processor 210 may then proceed to step 306, where it can direct the transmitter 212 to transmit to the base station the wide-band PMI and the recomputed CQIs.

7. Detailed Signaling Embodiment for DL Closed-Loop MU-MIMO

Turning now to a detailed signaling embodiment incorporating features described above, it should be noted that, for downlink MU-MIMO, two transmission modes, namely MIMO mode 3 (open loop MU-MIMO with non-adaptive precoding) and MIMO mode 4 (closed loop MU-MIMO with adaptive precoding), have been defined in the 802.16m standard. Out of these two transmission modes, only MIMO mode 4 (CL MU-MIMO) permits two-stream simultaneous transmission to a scheduled advanced mobile station (AMS) (a.k.a. UE or user-terminal or user). In particular, there is one stream assignment with 3 total streams, there are three stream assignments with 4 total streams and eight stream assignments with 8 total streams, that permit two-stream simultaneous transmission to one or more co-scheduled AMS. The eight stream assignments with 8 total streams here is applicable to only an advanced base station (ABS) (a.k.a. eNodeB or eNB or base station) with eight transmit antennas.

For an ABS with polarized TX antennas, which has been identified as an important configuration for practical deployment, the possibility of scheduling an MU-MIMO AMS with 2 streams is particularly beneficial. On the other hand, there is no support for such two-stream (or two-layer) per-AMS transmission in the feed back obtained from each potential MU-MIMO AMS. For supporting MU-MIMO, three MIMO feed back modes (MFM 5, 6 and 7) have been defined in the 802.16m standard. Out of these, MFM 6 targets CL (closed-loop) MU-MIMO with SLRU (sub-band logical resource unit) or NLRU (mini-band logical resource unit) allocation. We note that all of these three MFMs permit the feed back of (sub-band or wideband) PMI only from a rank-1 codebook. Moreover, the CQI is also computed assuming that the AMS will be served only one layer using the recommended PMI.

In accordance with exemplary aspects of the present principles described above, feed back support for CL MU-MIMO with two-layer transmission to one or more scheduled users can be enhanced. For example, for MU-MIMO feed back modes with codebook-based feed back, a parameter $\alpha$ that specifies the power-split between the desired stream(s) and the interfering streams that the AMS assumes can be defined. In particular, while computing its CQI, the AMS should assume that a fraction $\alpha$ of the transmit power will be used by the ABS for transmitting its desired stream(s), whereas the remaining fraction $1-\alpha$ will be used to transmit the interfering streams intended for the other co-scheduled users. A default value of $\alpha$ can denote an equal power split among all the co-scheduled streams. Examples of MFMs incorporating these aspects are provided herein below.

The modified feed back allocation information element (IE) described in Table 1 below supports up-to rank-2 CL MU-MIMO PMI feed back by permitting the ABS to suggest either rank-1 (space time coding rate-1 (STC-rate 1)) or rank-2 (STC-rate 2) to a user using the MU-rank field. In addition, it includes a parameter $\alpha$ that specifies the power-split between the desired stream(s) and the interfering streams. In particular, while computing its CQI, the AMS should assume that a fraction $\alpha$ of the transmit power will be used by the ABS for transmitting its (1 or 2) desired stream(s), whereas the remaining fraction $1-\alpha$ will be used to transmit the (MaxMt-1 or MaxMt-2) interfering streams intended for the other co-scheduled users. If MaxMt=MU-rank, the AMS feeds back MU-rank CL SU-MIMO CQI. In general MaxMt>=MU-rank.

TABLE 1

Feed back Allocation A-MAP IE-v1

| Syntax | Size (Bit) | Description/Notes |
|---|---|---|
| if (MFM==6) or (MFM== 7){ | — | — |
| MaxMt | 2 | If Nt=4 (any MFM) |
| | | 0b00: 1 |
| | | 0b01: 2 |
| | | 0b10: 3 |
| | | 0b11: 4 |
| | | If Nt=8 (MFM=6) |
| | | 0b00: 1 |
| | | 0b01: 2 |
| | | 0b10: 4 |
| | | 0b11: 8 |
| | | If Nt=8 (MFM=7) |
| | | 0b00: 1 |
| | | 0b01: 2 |
| | | 0b10: 3 |
| | | 0b11:4 |
| } | | |
| if (MFM==7) { | | |
| $\alpha$ | 1 | power split fraction |
| | | 0b0: Equal split among MaxMt streams |
| | | 0b1: 1/2 power for the desired stream and 1/2 power for the MaxMt-1 interfering streams |
| } | | |
| if (MFM==6) { | — | — |
| MU-rank | 1 | Suggested rank |
| | | 0b0: STC rate-1 |
| | | 0b1: STC rate-2 |
| If (MU-rank<MaxMt){ | | |
| A | 1 | power split fraction |
| | | 0b01: Equal split among MaxMt streams |
| | | 0b10: 1/2 power for the desired stream(s) and 1/2 power for the interfering streams |
| } | | |
| } | | |

In accordance another example, described below in Table 2, the modified feed back allocation IE supports up-to rank-2 CL MU-MIMO PMI feed back by permitting the AMS to decide between rank-1 (STC-rate 1) or rank-2 (STC-rate 2) precoding matrix feed back. In addition, it employs a parameter $\alpha$ that specifies the power-split between the desired stream(s) and the interfering streams. In particular, while computing its CQI, the AMS should assume that a fraction $\alpha$ of the transmit power will be used by the ABS for transmitting its (1 or 2) desired stream(s), whereas the remaining fraction $1-\alpha$ will be used to transmit the interfering streams intended for the other co-scheduled users.

TABLE 2

Feed back Allocation A-MAP IE-v2

| Syntax | Size (bit) | Description/Notes |
|---|---|---|
| if (MFM==6) or ( MFM== 7){ | — | — |
| MaxMt | 2 | If Nt=4 (any MFM)<br>0b00: 1<br>0b01: 2<br>0b10: 3<br>0b11: 4<br>If Nt=8 (MFM=6)<br>0b00: 1<br>0b01: 2<br>0b10: 4<br>0b11: 8<br>If Nt=8 (MFM=7)<br>0b00: 1<br>0b01: 2<br>0b10: 3<br>0b11: 4 |
| }<br>if (MFM==7){ | | |
| A | 1 | power split fraction<br>0b00: Equal split among MaxMt streams<br>0b01: 1/2 power for the desired stream and 1/2 power for the MaxMt-1 interfering streams |
| }<br>if (MFM==6){ | — | — |

TABLE 2-continued

Feed back Allocation A-MAP IE-v2

| Syntax | Size (bit) | Description/Notes |
|---|---|---|
| A | 1 | power split fraction with MU-rank (no greater than the minimum of MaxMt and 2) being decided by the AMS<br>0b01: Equal split among MU-rank streams<br>0b01: If MaxMt=MU-rank then<br>    Equal split among MU-rank streams<br>Else (MaxMt>MU-rank)<br>1/2 power for the desired MU-rank stream(s) and 1/2 power for the interfering (MaxMt-MU-rank) streams |
| } | | |

In accordance with another example, described below in Table 3, the modified feed back formats for MFM 6 support up-to rank-2 CL MU-MIMO PMI feed back by permitting the AMS to decide between rank-1 (STC-rate 1) or rank-2 (STC-rate 2) precoding matrix feed back. In particular, the AMS reports a preferred MU-rank in a long-term report (with a configurable long term period). In addition, the subsequent sub-band PMIs in the short term reports from the AMS correspond to the codebook of the reported MU-rank.

TABLE 3

Feedback formats for MFM 6-v2a

| Feed back Format | FBCH | Number of reports | Report period | Feed back fields | Notes |
|---|---|---|---|---|---|
| 0(M=1) | PFBCH | 3 | Short | Subband CQI or any type of EDI | Encoding type 0<br>No short term report when q=0 |
| | | | Short | Subband PMI | Encoding type 0<br>No short term report when q=0 |
| | | | Long | Best subbands index<br>MU-rank | Encoding type 1 |
| 1(M=2) | SFBCH | 2 | Short | For (m=1:M){<br>Subband differential CQI, subband PMI} | No Short term report when q=0 |
| | | | Long | Best subbands index, subband avg CQI, PFBCH indicator<br>MU-rank | |
| 2(M=3) | SFBCH | 2 | Short | For (m=1:M){<br>Subband differential CQI, subband PMI} | No Short term report when q=0 |
| | | | Long | Best subbands index, subband avg CQI, PFBCH indicator<br>MU-rank | |
| 3(M=4) | SFBCH | 2 | Short | For (m=1:M){<br>Subband differential CQI, subband PMI} | No Short term report when q=0 |
| | | | Long | Best subbands index, subband avg CQI, PFBCH indicator<br>MU-rank | |

In accordance with another example, described below in Table 4, the modified feed back formats for MFM 6 support up-to rank-2 CL MU-MIMO PMI feed back by permitting the AMS to decide between rank-1 (STC-rate 1) or rank-2 (STC-rate 2) precoding matrix feed back. In particular, the AMS reports a preferred MU-rank in each short-term report (with a configurable short-term period). In addition, the subband PMI included in that short term report corresponds to the codebook of the reported MU-rank.

TABLE 4

Feedback formats for MFM 6-v2b

| Feed back Format | FBCH | Number of reports | Report period | Feed back fields | Notes |
|---|---|---|---|---|---|
| 0(M=1) | PFBCH | 3 | Short | Subband CQI or any type of EDI | Encoding type 0 No short term report when q=0 |
| | | | Short | Subband PMI MU-rank | Encoding type 0 No short term report when q=0 |
| | | | Long | Best subbands index | Encoding type 1 |
| 1(M=2) | SFBCH | 2 | Short | For (m=1:M){ Subband differential CQI, when q=0 subband PMI, MU-rank | No Short term report |
| | | | Long | Best subbands index, subband avg CQI, PFBCH indicator | |
| 2(M=3) | SFBCH | 2 | Short | For (m=1:M){ Subband differential CQI, subband PMI, MU-rank | No Short term report when q=0 |
| | | | Long | Best subbands index, subband avg CQI, PFBCH indicator | |
| 3(M=4) | SFBCH | 2 | Short | For (m=1:M){ Subband differential CQI, subband PMI, MU-rank | No Short term report when q=0 |
| | | | Long | Best subbands index, subband avg CQI, PFBCH indicator | |

8. Scheduling at the Base Station

Figure 5:
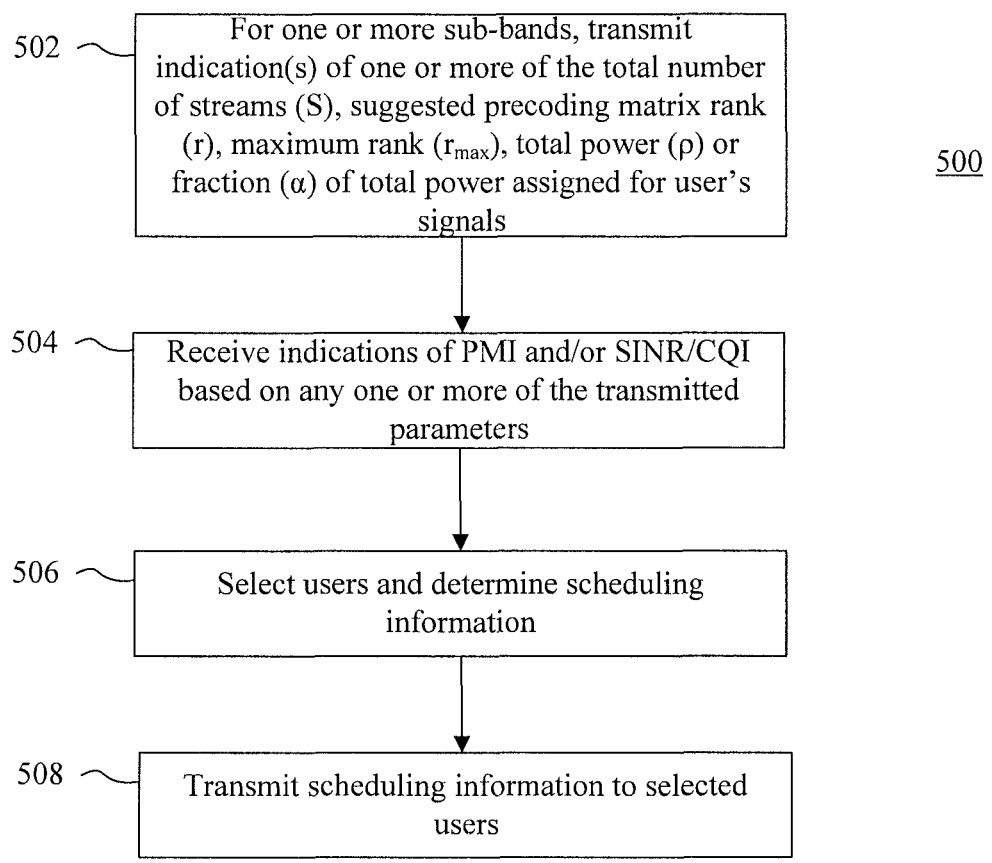
FIG. 5 is a flow diagram of an exemplary method for scheduling MU-MIMO users in an OFDMA system.

Referring now to FIG. 5 with continuing reference to FIGS. 1-3, a method 500 for scheduling MU-MIMO users in an OFDMA system is illustrated. In particular, the base station 104 can be configured to implement the method 500, which can complement the method 300 described above. The method 500 can begin at step 502 in which the controller 206 can direct the transmitter 208 to transmit scheduling parameters for one or more sub-bands to each prospective user. For example, as described above, such parameters for any particular user 102 can include an indication of any one or more of an estimate of (or an upper bound on) the total number of streams (S) that the base station will schedule on a sub-band, a suggested precoding matrix rank (r) for a particular user 102, a maximum rank ($r_{max}$) for the particular user 102, an estimate of the per-RB total power ($\rho$) of signals transmitted to all users co-scheduled with the particular user 102 and the fraction ($\alpha$) of the total power that will be employed for the data signals directed to the particular user 102. Here, the controller 206 can employ the scheduler 204 to determine the scheduling parameters using, for example, methods described in the above-referenced co-pending utility applications.

At step 504, the receiver 208 of the base station 104 can receive, from each prospective user 102, indications of a preferred PMI and/or SINR/CQI based on any one or more of the parameters transmitted at step 502. For example, the indications can be the same indications that can be transmitted by the user 102 at step 306, as described above.

At step 506, the scheduler 204 can select an appropriate set of the prospective users to schedule and can determine scheduling information for the selected users. Such scheduling information can include a transmit precoder and an assigned rate for each user and/or each stream.

In order to compute the scheduling information, the base station should be able to compute an estimate of the SINR for each co-scheduled stream in each choice of user set and associated transmit precoders. A method for computing such an estimate is described herein below. It should be noted that the method described below can be performed by the scheduler 204. The method permits the scheduler 204 of the base station 104 to co-schedule an arbitrary number of streams (not necessarily equal to the value S that was conveyed to the users) along arbitrary transmit precoders. In particular, suppose that the base station 104 considers co-scheduling Q users, for example user-1 to user-Q, who have reported precoders $\{\hat{G}_j\}_{j=1}^Q$, respectively. Also assume all users employ linear MMSE receivers and let $H_1^\dagger$ to $H_Q^\dagger$ represent the channels seen by users 1 to Q, respectively. Let $V_j=[v_j^1,\ldots,v_j^{r_j}]$ denote the M×$r_j$ transmit precoder (of rank $r_j$ and with unit-norm columns) that the base station 104 intends to employ for user j, $1 \leq j \leq Q$ such that $R'=\Sigma_{j=1}^Q r_j \leq M$. Define $A=[V_1, V_2, \ldots, V_Q]$. It can be shown that the true SINR seen by user-j for its $i^{th}$ stream that is transmitted along $v_j^i$ is given by $$\sin r_j^i = \hat{\rho} v^{i\dagger}_j H_j (I + \rho H_j^\dagger (AA^\dagger - v_j^i v_j^{i\dagger}) H_j)^{-1} H_j^\dagger v_j^i \quad (24)$$

where $\hat{\rho}=\rho/R'$ is the power per stream. Then, the following simple but useful lemma provides an alternate expression for the SINR given in (24).

Lemma 2 The true SINR seen by user-j for its $i^{th}$ stream is equal to $$\sin r_j^i = \frac{\alpha_j^i}{1-\alpha_j^i} \quad (25)$$

$$\alpha_j^i = \left[(I + A^\dagger R_j A)^{-1} A^\dagger R_j A\right]_{\Sigma_{m=1}^{j-1} r_m + i, \Sigma_{m=1}^{j-1} r_m + i}$$

for all $i=\{1,\ldots r_j\}$ and where $R_j=\hat{\rho} H_j H_j^\dagger$.

An important consequence of (25) is that the BS 104 can approximate the matrix $R_j$ by $\hat{R}_j$ and then determine approximate SINRs as $$\hat{\sin} r_j^i = \frac{\hat{\alpha}_j^i}{1-\hat{\alpha}_j^i} \quad (26)$$

$$\hat{\alpha}_j^i = \left[(I + A^\dagger \hat{R}_j A)^{-1} A^\dagger \hat{R}_j A\right]_{\Sigma_{m=1}^{j-1} r_m + i, \Sigma_{m=1}^{j-1} r_m + i}$$

Here we employ the following approximation $$R_j \approx \hat{R}_j \triangleq \hat{G}_j \hat{D}_j \hat{G}_j^\dagger, \forall j, \quad (27)$$

where $\hat{D}_j=\text{diag}\{\gamma_j S\gamma_j \hat{\text{SINR}}_j^1 R_j^1, \ldots, S \hat{\text{SINR}}_j^{r_j'} R_j^{r_j'}\}$ and $r_j' \geq 1$ is the rank of $\hat{G}_j$. $\{S \hat{\text{SINR}}_j^i R_j^i\}$ are the SINRs reported by user i after quantizing SINRs determined using (5) or (13). $\gamma_j$ is a scaling factor such that $\gamma_j=S/R'$ if user j employs (5) and $\gamma_j=r_j/R'$ when the user employs (13) instead.

Remark 1 Note that the approximation in (27) attempts to obtain the best rank $r_j'$ approximation of $R_j$ based one the feed back of user-j. Clearly the best rank $r_j'$ approximation of $R_j$ is the matrix formed when $\hat{G}_j$ contains the $r_j'$ dominant eigenvectors of $R_j$ and $\hat{D}_j$ contains the $r_j'$ dominant eigenvalues. It can be verified that $\hat{R}_j$ approaches $R_j$ as the codebook and quantization resolution improve. Note however, that even under the best rank $r_j'$ approximation of $R_j$, $s\hat{\sin} r_j^i r_j^i$ can be different from $\sin r_j^i$ if $r_j'<\text{Rank}(R_j)$.

Remark 2 Under the approximation in (27) and (25), user-j sees no interference from co-scheduled user-q if $V_j^\dagger V_g=0$.

After the base station 104 computes the scheduling information at step 506, the controller 206 of the base station 104 can direct the transmitter 208 to transmit the respective scheduling information to the selected users.

Having described preferred embodiments of systems and methods incorporating MU-MIMO-OFDMA multi-rank CQI and precoder signaling schemes (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for determining attributes of communication channels of multi-user (MU)-multiple input multiple output (MIMO) users in an orthogonal frequency division multiplexing based multiple access (OFDMA) system, the method comprising:
   receiving from a base station, for at least one sub-band of contiguous sub-carriers, an indication of an estimate of or an upper-bound on a total number of streams (S) that are co-scheduled together by the base station on the at least one sub-band and a suggested rank (r);
   determining one or more signal quality measures for the at least one sub-band based on the estimate of or the upper-bound on the total number of streams that are co-scheduled together by the base station on the at least one sub-band and the suggested rank (r) in accordance with at least one of single-user scheduling rules or multi-user scheduling rules; and
   transmitting to the base station an indication of the one or more signal quality measures and at least one tag identifying each signal quality measure as being determined in accordance with the single-user scheduling rules or the multi-user scheduling rules.

2. The method of claim 1, wherein the signal quality measures are signal-to-interference-plus-noise ratios (SINRs), the indication of the one or more signal quality measures is an indication of one or more channel quality indices (CQIs) that are based on the SINRs, wherein the method further comprises:
   determining a precoder matrix for the at-least one sub-band based on the estimate of or the upper-bound on the total number of streams that are co-scheduled together by the base station on the at least one sub-band in accordance with at least one of single-user scheduling rules or multi-user scheduling rules, wherein the transmitting further comprises transmitting to the base station an indication of the precoder matrix and at least one other tag identifying the precoder matrix as being determined in accordance with the single-user scheduling rules or the multi-user scheduling rules.

3. The method of claim 2, wherein the determining the one or more SINRs and the determining the precoder matrix are based on the suggested rank.

4. The method of claim 3, wherein at least one of the precoder matrix or the one or more SINRs are determined under the assumption that r streams are co-scheduled together for transmission with equal power to a particular user and that S−r streams are co-scheduled together for transmission with equal power to users co-scheduled together with the particular user.

5. The method of claim 3, the precoder matrix and the one or more SINRs are determined under the multi-user scheduling rules.

6. The method of claim 5, wherein the determining one or more signal quality measures further comprises determining one or more other signal quality measures in accordance with the single-user scheduling rules based on the precoder matrix and wherein the transmitting further comprises transmitting an indication of the one or more other signal quality measures.

7. The method of claim 3, wherein the precoder matrix and the one or more SINRs are determined under the single-user scheduling rules, wherein the method further comprises determining one or more other signal quality measures in accordance with the multi-user scheduling rules based on the precoder matrix and wherein the transmitting further comprises transmitting an indication of the one or more other signal quality measures.

8. The method of claim 7, wherein the precoder matrix is a first precoder matrix, wherein the method further comprises determining a second precoder matrix based on the first precoder matrix in accordance with the multi-user scheduling rules and wherein the transmitting further comprises transmitting an indication of the second precoder matrix to the base station.

9. The method of claim 8, wherein the determining the first precoder matrix comprises determining an other rank as the rank for the first precoder matrix, wherein the determining the second precoder matrix comprises selecting the minimum rank between the received rank and the other rank as the rank for the second precoder matrix and wherein the transmitting further comprises transmitting an indication of the other rank to the base station.

10. The method of claim 9, wherein the determining the second precoder matrix comprises determining a sub-matrix of the first precoder matrix as the second precoder matrix.

11. A method for determining attributes of communication channels of multi-user (MU)-multiple input multiple output (MIMO) users in an orthogonal frequency division multiplexing based multiple access (OFDMA) system, the method comprising:
receiving from a base station, for at least one sub-band of contiguous sub-carriers, an indication of a suggested or an upper-bound precoder rank, an indication of a total power ($\rho$) applied to streams that are co-scheduled together by the base station on the at least one sub-band and an indication of a fraction ($\alpha$) of the total power that is applied to streams that are co-scheduled together for transmission to a particular user;
determining one or more signal quality measures for the at-least one sub-band based on at least one of the total power, the fraction or the suggested or upper-bound precoder rank in accordance with at least one of single-user scheduling rules or multi-user scheduling rules; and
transmitting to the base station an indication of the one or more signal quality measures and at least one tag identifying each signal quality measure as being determined in accordance with the single-user scheduling rules or the multi-user scheduling rules.

12. The method of claim 11, wherein the signal quality measures are signal-to-interference-plus-noise ratios (SINRs), the indication of the one or more signal quality measures is an indication of one or more channel quality indices (CQIs) that are based on the SINRs, wherein the method further comprises:
determining a precoder matrix for the at-least one sub-band based on at least one of the total power, the fraction or the suggested or upper-bound precoder rank in accordance with at least one of single-user scheduling rules or multi-user scheduling rules, wherein the transmitting further comprises transmitting to the base station an indication of the precoder matrix and at least one other tag identifying the precoder matrix as being determined in accordance with the single-user scheduling rules or the multi-user scheduling rules.

13. The method of claim 12, wherein at least one of the precoder matrix or the one or more SINRs are determined under the assumption that $\alpha\rho$ is the sum power of the streams that are co-scheduled together for transmission to the particular user and that $(1-\alpha)\rho$ is the sum power of streams that are co-scheduled together for transmission to users co-scheduled together with the particular user.

14. The method of claim 12, wherein the precoder matrix and the one or more SINRs are determined under the multi-user scheduling rules.

15. The method of claim 14, wherein the determining one or more signal quality measures further comprises determining one or more other signal quality measures in accordance with the single-user scheduling rules based on the precoder matrix and wherein the transmitting further comprises transmitting an indication of the one or more other signal quality measures.

16. The method of claim 12, wherein the precoder matrix and the one or more SINRs are determined under the single-user scheduling rules, wherein the method further comprises determining one or more other signal quality measures in accordance with the multi-user scheduling rules based on the precoder matrix and wherein the transmitting further comprises transmitting an indication of the one or more other signal quality measures.

17. The method of claim 16, wherein the precoder matrix is a first precoder matrix, wherein the method further comprises determining a second precoder matrix based on the first precoder matrix in accordance with the multi-user scheduling rules and wherein the transmitting further comprises transmitting an indication of the second precoder matrix to the base station.

18. The method of claim 17, wherein the determining the first precoder matrix comprises determining an other rank as the rank for the first precoder matrix, wherein the determining the second precoder matrix comprises selecting the minimum rank between the received rank and the other rank as the rank for the second precoder matrix and wherein the transmitting further comprises transmitting an indication of the other rank to the base station.

19. The method of claim 18, wherein the determining the second precoder matrix comprises determining a sub-matrix of the first precoder matrix as the second precoder matrix.

20. A receiver system for determining precoders for communication channels of multi-user (MU)-multiple input multiple output (MIMO) users in an orthogonal frequency division multiplexing based multiple access (OFDMA) system comprising:
a receiver configured to receive from a base station, for at least one sub-band of contiguous sub-carriers, an indication of a suggested or an upper-bound precoder rank, an indication of a total power applied to streams that are co-scheduled together by the base station on the at least one sub-band and an indication of a fraction of the total power that is applied to streams that are co-scheduled together for transmission to the receiver system;
a processor configured to determine a precoder matrix for the at least one sub-band based on at least one of the total power, the fraction or the suggested or upper-bound precoder rank in accordance with at least one of single-user scheduling rules or multi-user scheduling rules; and
a transmitter configured to transmit to the base station an indication of the precoder matrix and to transmit at least one tag identifying the precoder matrix as being determined in accordance with the single-user scheduling rules or the multi-user scheduling rules.

* * * * *